(12) United States Patent
Akagi et al.

(10) Patent No.: US 8,896,741 B2
(45) Date of Patent: Nov. 25, 2014

(54) PHOTOGRAPHING DEVICE, PHOTOGRAPHING METHOD, AND PORTABLE TERMINAL APPARATUS

(75) Inventors: Miwa Akagi, Kawasaki (JP); Atsushi Miura, Kawasaki (JP); Katsuaki Akama, Kawasaki (JP); Yukio Takayashiki, Kawasaki (JP); Takashi Wakabayashi, Maebashi (JP); Mikihiko Yamamoto, Kawasaki (JP); Shoichi Sato, Kawasaki (JP)

(73) Assignees: Fujitsu Limited, Kawasaki (JP); Fujitsu Frontech Limited, Inagi (JP)

( * ) Notice: Subject to any disclaimer, the term of this patent is extended or adjusted under 35 U.S.C. 154(b) by 588 days.

(21) Appl. No.: 12/689,400

(22) Filed: Jan. 19, 2010

(65) Prior Publication Data

US 2010/0208123 A1     Aug. 19, 2010

(30) Foreign Application Priority Data

Feb. 13, 2009    (JP) ................................. 2009-031660

(51) Int. Cl.
  *H04N 5/222*   (2006.01)
  *H04N 5/262*   (2006.01)
  *H04N 5/272*   (2006.01)
  *H04N 5/77*    (2006.01)

(52) U.S. Cl.
  CPC ............ *H04N 5/272* (2013.01); *H04N 5/2628* (2013.01); *H04N 5/772* (2013.01)
  USPC ..................... 348/333.12; 348/63; 348/240.2; 348/333.11; 396/379

(58) Field of Classification Search
  USPC ....................... 348/333.12, 240.2, 63, 333.11; 396/378, 379
  See application file for complete search history.

(56) References Cited

U.S. PATENT DOCUMENTS

| 4,589,029 | A | * | 5/1986 | Torimaru et al. | ......... | 348/333.12 |
| 4,637,022 | A | * | 1/1987 | Burke et al. | ................... | 714/784 |
| 5,103,251 | A | * | 4/1992 | Kudo | ............................... | 396/60 |
| 5,754,230 | A | * | 5/1998 | Tsuruta | ..................... | 348/333.12 |
| 2003/0026609 | A1 | * | 2/2003 | Parulski | ......................... | 396/281 |
| 2004/0166894 | A1 | * | 8/2004 | Shirakawa | ................. | 455/556.1 |
| 2005/0046730 | A1 | * | 3/2005 | Li | ............................. | 348/333.12 |
| 2005/0185948 | A1 | * | 8/2005 | Saito et al. | ..................... | 396/133 |

(Continued)

FOREIGN PATENT DOCUMENTS

| JP | 11-196301 A | 7/1999 |
| JP | 2005-094782 A | 4/2005 |
| JP | 2008-134438 A | 6/2008 |

OTHER PUBLICATIONS

Japanese Office Action dated Jul. 3, 2012, issued in corresponding Japanese Patent Application No. 2009-031660, (15 pages). With English Translation.

*Primary Examiner* — Paul Berardesca
(74) *Attorney, Agent, or Firm* — Westerman, Hattori, Daniels & Adrian, LLP

(57) ABSTRACT

A photographing device to photograph an object includes a displaying unit to display an image acquired from the object, an image recording unit to record the image, an enlarged image generating unit to extract a portion or whole of the image displayed on the displaying unit to generate an enlarged image from the image, and a display control unit to display the enlarged image instead of the image on the displaying unit or in an overlapped manner with the image before capturing the image into the image recording unit.

16 Claims, 23 Drawing Sheets

(56) References Cited

U.S. PATENT DOCUMENTS

2005/0219393 A1* 10/2005 Sugimoto .............. 348/333.01
2006/0146174 A1    7/2006 Hagino
2006/0171703 A1*  8/2006 Abe et al. .................. 396/311
2007/0257996 A1* 11/2007 Kurosawa et al. ....... 348/240.99
2007/0296845 A1* 12/2007 Watanabe et al. ........ 348/333.12
2008/0024643 A1*  1/2008 Kato ....................... 348/333.01
2009/0153649 A1*  6/2009 Hirooka et al. ............... 348/47
2010/0149402 A1*  6/2010 Aoki et al. .............. 348/333.12

* cited by examiner

FIG.8

84
(224) { THE CLOSE-UP MODE ENABLES ZOOMING WITH THE CURSOR KEYS.
IF THE CLOSE-UP PHOTOGRAPHING STATE IS CONTINUED, THE PHOTOGRAPHING MODE IS AUTOMATICALLY CANCELED.
WHEN THE SETTING IS CHANGED FROM THE CLOSE-UP MODE TO THE NORMAL MODE, THE SELECTION SHOULD BE MADE ON THE MENU.

PHOTOGRAPHING DEVICE, PHOTOGRAPHING METHOD, AND PORTABLE TERMINAL APPARATUS

CROSS-REFERENCE TO RELATED APPLICATIONS

This application is based upon and claims the benefit of priority of the prior Japanese Patent Application No. 2009-031660, filed on Feb. 13, 2009, the entire contents of which are incorporated herein by reference.

FIELD

The embodiments discussed herein are related to a photographing technique of photographing an object to acquire an image thereof and, for example, to a device and a method, which include expanding a process such as magnifying an image.

BACKGROUND

A photographing function is provided not only in a camera, which is a dedicated device, but also in a portable terminal apparatus, such as a portable telephone, and an electronic device handling electronic information, such as a personal computer. This photographing function has a normal photographing mode including a photographing mode for scenery, etc., and a portrait photographing mode for photographing a person as well as a close-up photographing mode for performing close-up photographing. The close-up photographing mode is directed to various applications such as photographing letters and newspapers to record and store the images thereof as image information.

A portable telephone is known that has an OCR (Optical character Recognition) function mode for photographing characters or barcodes in relation to this photographing function (e.g., Japanese Laid-Open Patent Publication No. 2005-94782). It is also known that a logo is added to a digital camera to notify a user of an operation state by changing a light-emission state of the logo (e.g., Japanese Laid-Open Patent Publication No. 2008-134438).

If an object includes small characters, etc., such as letters and newspapers, an image displayed on a screen is inconveniently small and unrecognizable. Although a text document such as e-mail may be displayed in a larger scale on the screen by enlarging a character font, if an image is enlarged by a zoom function, the recorded image itself is enlarged and this is not suitable for image enlargement solely intended for checking. Such a relationship between the zoom function and the recorded image applies not only to the close-up photographing mode but also to the long-distance photographing for scenery, etc., and the portrait photographing. To record an image before zoom-in after an object or an image is checked in an enlarged image using the zoom function, an operation of restoration to the image before zoom-in is necessary.

If such a zoom operation is performed, this is added to a photographing time. In this case, even if a photographable image is displayed, operations are necessary for shifting to the zoom mode for checking the image and for shifting to the photographing after canceling the zoom. Therefore, it may be that operability of a user and promptness of image acquisition are deteriorated.

The switch-over from the normal photographing mode to the close-up photographing mode is performed in a manual operation. If the switch-over to the close-up photographing mode is performed regardless of the image being displayed or whether the object thereof is photographable in close-up, it may be that the acquired image becomes different from the image intended by a user. In this case, troubles occur such as being forced to perform rephotographing and it may be that the photographing becomes unavailable since the timing of photographing is missed for some objects.

SUMMARY

According to an aspect of the invention, a photographing device is a photographing device acquiring an image from an object, and may include a displaying unit, an image recording unit, an enlarged image generating unit and a display control unit. The displaying unit displays the image acquired from the object, and the image recording unit records the image. The enlarged image generating unit extracts a portion or whole of the image displayed on the displaying unit to generate an enlarged image from the extracted image, and the display control unit displays the enlarged image instead of the image on the displaying unit or in an overlapped manner with the image, before capturing the image into the image recording unit.

According to another aspect of the invention, a photographing method is a photographing method to acquire an image from an object and includes display of an image, generation of an enlarged image, and display of the enlarged image. The display of an image includes displaying the image acquired from the object, and the generation of an enlarged image includes extracting a portion or whole of the displayed image to generate an enlarged image from the extracted image. The display of the enlarged image includes displaying the enlarged image instead of the image being displayed or in an overlapped manner with the image, before capturing the image into a recording unit.

According to another aspect of the invention, a recording medium stores a photographing program operable to be executed by a computer in a computer readable manner. The photographing program has an image displaying function, an enlarged image generating function and an enlarged image displaying function. The image displaying function displays the image acquired from the object, and the enlarged image generating function extracts a portion or whole of the displayed image to generate an enlarged image from the extracted image. The enlarged image displaying function displays the enlarged image instead of the image being displayed or in an overlapped manner with the image, before capturing the image into a recording unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Other objects, features and advantages of the present invention will become more apparent by reference to the accompanying drawings and each of embodiments.

BRIEF DESCRIPTION OF DRAWINGS

FIG. 8 is a diagram of an example of a captured image;

DESCRIPTION OF EMBODIMENTS

First Embodiment

A first embodiment is an example of a photographing device, a photographing method, a photographing program, and a portable terminal apparatus, which include photographing an object. In this embodiment, a close-up photographing screen depending on a focused state is displayed on a displaying unit that displays an image acquired from the object. On the close-up photographing screen, a portion of the image thereof (an enlarged area) is extracted to generate an enlarged image with a digital process and the enlarged image is displayed instead of the image of the close-up photographing screen. This enlarged image enables check of details of the image on the close-up photographing screen.

In this embodiment, a software key for switching over to a close-up photographing function when the close-up photographing function becomes available is displayed to guide a user such that a switching operation to the close-up photographing function may be performed.

In this embodiment, image contents acquired from an object is able to be automatically determined based on, for example a focused state thereof, and to switch over to the close-up photographing function.

Therefore, according to the first embodiment, a portion of an image acquired by the close-up photographing function for photographing documents, barcode reader, handwritten memo, etc., may be enlarged by a magnifying glass function to generate an enlarged image and the convenience of a photographing function can be enhanced in such a way that details of the close-up photographing image can be checked from the enlarged image.

Figure 1:
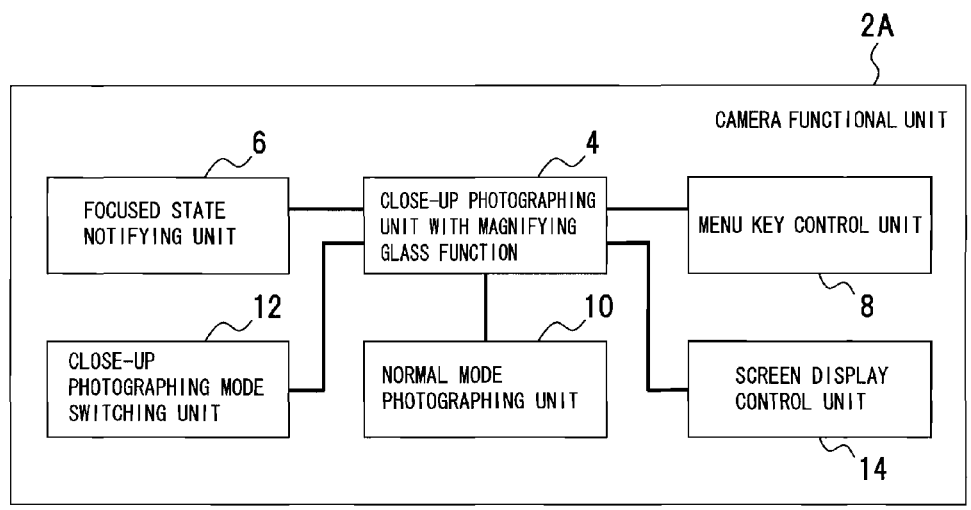
FIG. 1 is a diagram of an example of a camera functional unit according to a first embodiment.

The first embodiment will be described with reference to FIG. 1. FIG. 1 depicts an example of a camera functional unit according to the first embodiment. The configuration depicted in FIG. 1 is an example and the present invention is not limited to this configuration.

A camera functional unit 2A is an example of a functional unit that extracts an image from an enlarged area on an image of a photographing frame containing an object to generate an enlarged image from the image to display the enlarged image before capturing (photographing) the image of the photographing frame. The photographing frame is a photographable range of the object. The enlarged area is an enlarged region set on the image of the photographing frame, which is a portion or whole of the image, and may be a center portion of the photographing frame or a position deviated from the center portion.

As depicted in FIG. 1, the camera functional unit 2A includes a close-up photographing unit with a magnifying glass function 4, a focused state notifying unit 6, a menu key control unit 8, a normal mode photographing unit 10, a close-up photographing mode switching unit 12, and a screen display control unit 14.

The close-up photographing unit with a magnifying glass function 4 is an example of an enlarged image generating unit that extracts an image from a portion of an image acquired from an object (enlarged area) to generate an enlarged image from the image, a photographing functional unit that performs close-up photographing, and an image recording control unit. The close-up photographing unit with the magnifying glass function 4 determines whether a close-up photographable image is acquired based on the notification information from the focused state notifying unit 6. If a close-up photographable image is acquired, switch-over to the close-up photographing mode is performed through the close-up photographing mode switching unit 12. The magnifying glass function is a function of enlarging the image extracted from the image acquired from the object by, for example, eight times.

The focused state notifying unit 6 is an example of a functional unit that makes a notification of a focused state of the image acquired from the object and notifies the close-up photographing unit with a magnifying glass function 4 of the focused state as camera focus information. The notification of the focused state includes, for example, focal distance information of the image in the focused state.

The menu key control unit 8 is a functional unit that performs selection control of a menu including a magnifying glass, close-up photographing, and performs execution control of the menu based on selection operations of menu keys.

The normal mode photographing unit 10 is an example of a functional unit that executes a normal photographing mode, a long-distance photographing mode, and a portrait photographing mode, which are photographing modes other than the close-up photographing mode. A zoom function may be provided not only for the close-up photographing mode but also for the normal photographing mode, the long-distance photographing mode, or the portrait photographing mode and is not limited to the close-up photographing mode. The long-distance photographing mode is a mode including telephotographing.

The close-up photographing mode switching unit 12 is an example of a functional unit that executes the switch-over from the normal photographing mode to the close-up photographing mode, and the close-up photographing. This close-up photographing mode includes a zoom function mode and a magnifying glass function mode. The zoom function mode is a function of step-by-step increasing or decreasing the magnification of an image through key operations. The magnifying glass function mode is a function of extracting an enlarged area at the center portion of the photographing frame to generate an enlarged image at a predetermined magnification.

The screen display control unit 14 is an example of a control unit of a displaying unit made up of LCD (liquid crystal display), etc., and controls the display of an image acquired from an object, the display of an enlarged image of the image, the switch-over from the normal image to the enlarged image, the switch-over from the enlarged image to the normal image, etc.

Figure 2:
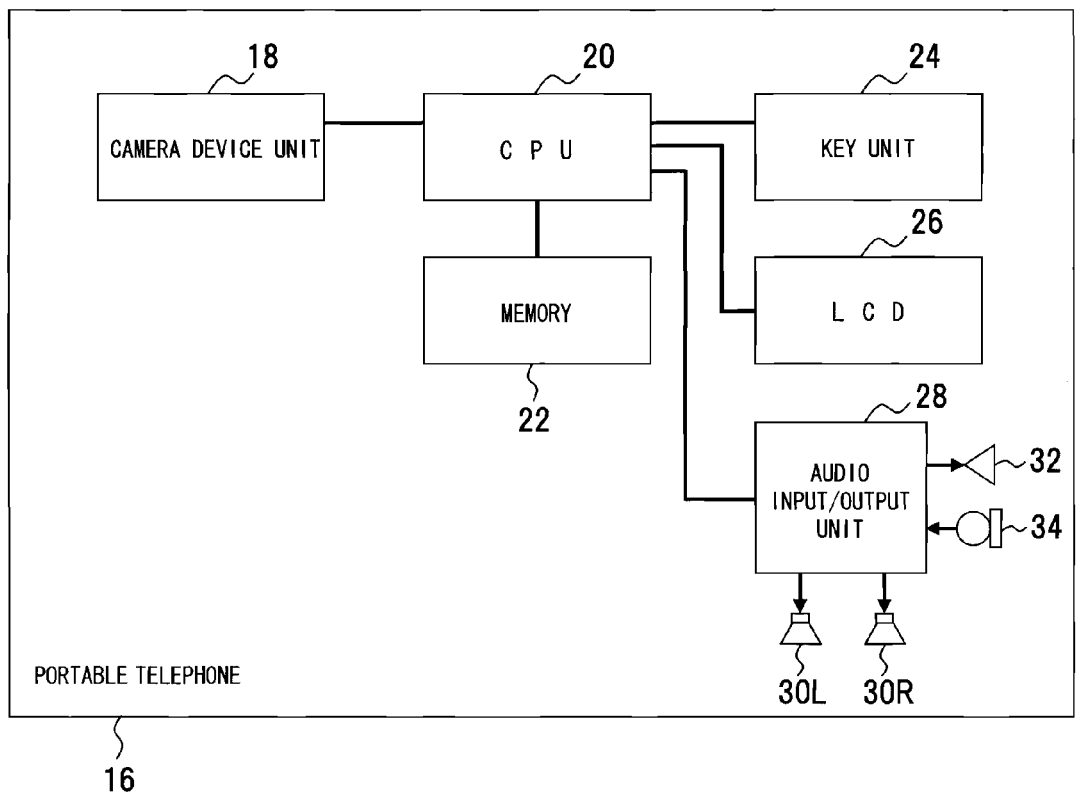
FIG. 2 is a diagram of a portable telephone according to a first embodiment.
Figure 3:
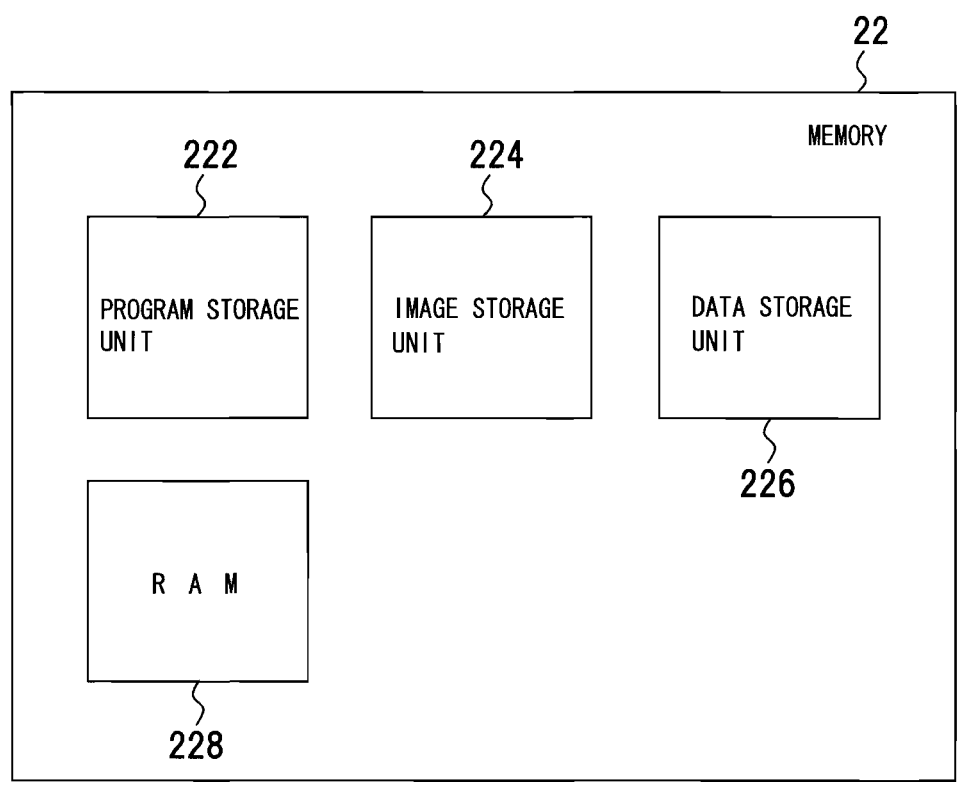
FIG. 3 is a diagram of an example of a memory.

Hardware implementing the camera functional unit 2A will be described with FIGS. 2 and 3. FIG. 2 depicts a portable telephone according to the first embodiment and FIG. 3 depicts a memory. The configurations depicted in FIGS. 2 and 3 are examples and the present invention is not limited to these configurations. In FIGS. 2 and 3, the same portions are denoted by the same reference numerals.

This portable telephone 16 is an example of a photographing device, a photographing method, a photographing program, or a portable terminal apparatus, and implements the camera functional unit 2A described above in this embodiment. Therefore, as depicted in FIG. 2, the portable telephone 16 includes a camera device unit 18, a CPU (central processing unit) 20, a memory 22, a key unit 24, an LCD 26, and an audio input/output unit 28. Although not depicted, the portable telephone 16 also has a telephone functional unit, etc.

The camera device unit 18 is an example of a functional unit that acquires an image from an object, includes, for example, CCD (charge coupled device) and other functional units, etc., as an optical system, a focus mechanism, and an image pickup device for acquiring the image from the object, and controls the optical system in the focused state for the object to acquire the image from the object.

The CPU 20 is an example of a processing unit of image information and a control unit of various functional units and makes up an enlarged image generating unit, a display control unit, and an image recording control unit. The CPU 20 executes OS (operating system) and application programs in the memory 22 to implement the camera functional unit 2A described above, control the various functional units such as the camera device unit 18, the key unit 24, the LCD 26, and capture information.

The memory 22 is an example of a recording unit that stores the OS and the application programs and that records acquired images. The memory 22 is constituted of a recording medium. A memory device is an example of the recording medium.

The key unit 24 is an example of an input operating unit including a shutter key for photographing, selection keys for the magnifying glass function, the close-up function, etc., and functional keys corresponding to software keys displayed as images on the LCD 26, and these functional keys are assigned with any one or more functions of an enlargement magnification specifying unit, an enlargement instructing unit, and an image capture instructing unit. The enlargement magnification specifying unit is a means of specifying an enlargement magnification. The enlargement instructing unit is a means of giving an instruction for generating an enlarged image. The image capture instructing unit is a means for capturing/photographing an image being shot.

The LCD 26 is an example of a displaying unit that displays an image and displays the image acquired from the object, the enlarged image enlarging a portion or whole of the image, and the software keys for selecting functions. As to the software keys, functions of the enlargement magnification specifying unit, the enlargement instructing unit, and the image capture instructing unit assigned to the software keys are displayed as images.

The audio input/output unit 28 is an example of a functional unit that inputs or outputs sound and includes a speakers 30R and 30L, a receiver 32, a microphone 34, etc., along with an audio amplifier to perform output of the sound representative of switch-over of functions and the guide voices and input/output of phone call voices.

As depicted in FIG. 3, the memory 22 includes a program storage unit 222, an image storage unit 224, a data storage unit 226, and a RAM (random-access memory) 228. The program storage unit 222 is an example of a ROM (read-only memory) and stores the OS described above and various programs such as a photographing program as an application program and sub-routines for extraction, enlargement, and reduction of an image.

The image storage unit 224 is an example of an image recording unit that records the image acquired from the object and is made up of a recording medium such as a flash memory. The data storage unit 226 is an example of a storage unit of various acquired data and is made up of a recording medium such as a flash memory.

The RAM 228 makes up a work area for deploying the OS and the application programs. The camera functional unit 2A described above is implemented by the RAM 228, the CPU 20, etc.

Figure 4:
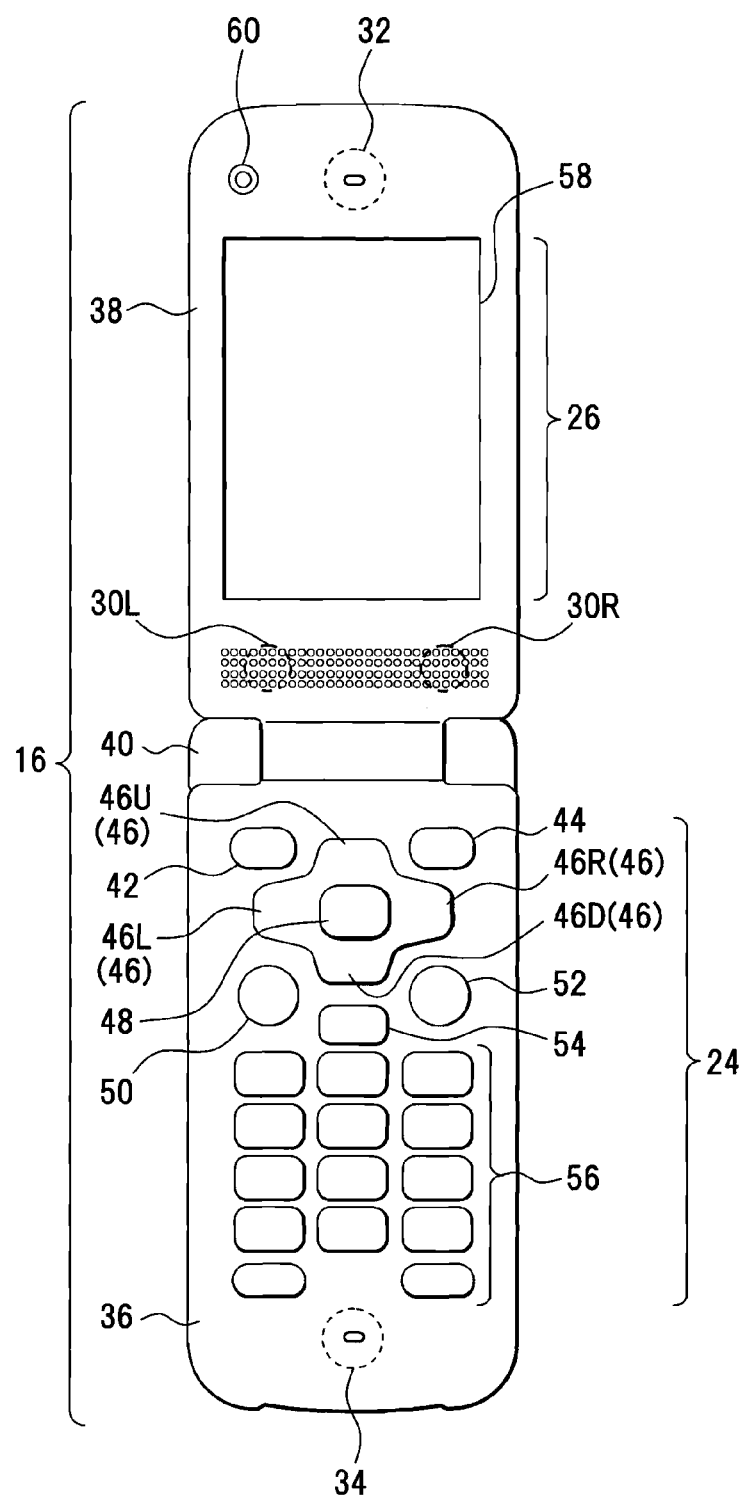
FIG. 4 is a diagram of a front surface portion of the portable telephone.
Figure 5:
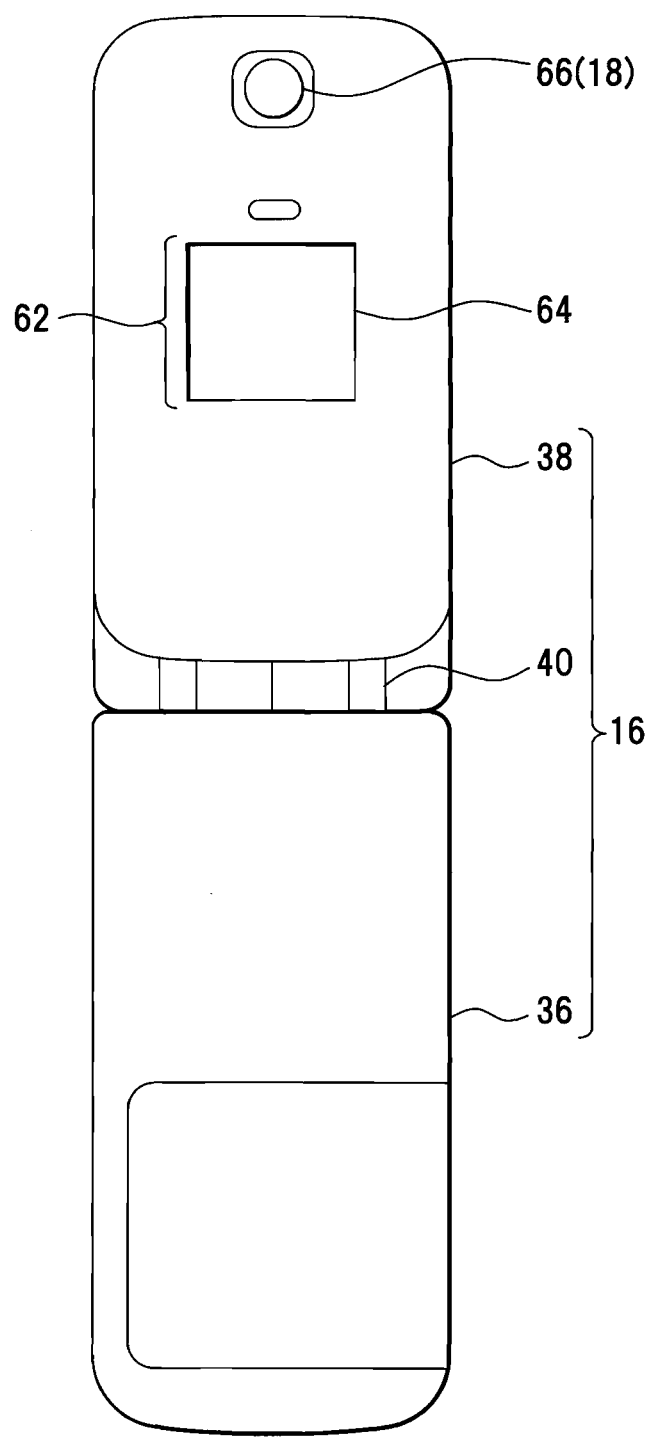
FIG. 5 is a diagram of a back surface portion of the portable telephone.

Details of the portable telephone 16 will be described with reference to FIGS. 4 and 5. FIG. 4 depicts a front surface portion of the portable telephone and FIG. 5 depicts a back surface portion of the portable telephone. The configurations depicted in FIGS. 4 and 5 are examples and the present invention is not limited to these configurations. In FIGS. 4 and 5, the portions same as FIG. 2 are denoted by the same reference numerals.

As depicted in FIG. 4, the portable telephone 16 includes a first housing unit 36 and a second housing unit 38 coupled with a hinge unit 40 in an openable/closable manner. The housing unit 36 makes up a fixed housing unit and the housing unit 38 makes up a movable housing unit. A front surface portion of the housing unit 36 is disposed with the key unit 24, the microphone 34, etc. The key unit 24 is an example of hardware keys and makes up an input operating unit provided for operations such as input and selection of information by a user.

The key unit 24 is disposed with hardware keys assigned with the above functions. The hardware keys include a menu key 42, a phonebook key 44, cursor keys 46, a decision key 48, a start key 50, an end/power key 52, a clear key 54, and symbol keys 56. The cursor keys 46 include an up cursor key 46U, a left cursor key 46L, a right cursor key 46R, and a down cursor key 46D (hereinafter, simply "the up key 46U, the left key 46L, the right key 46R, and the down key 46D") (FIG. 6), and the up key 46U, the left key 46L, the right key 46R, and the down key 46D are assigned with operations of moving a cursor displayed on a display screen 58 of the LCD 26 and other functions.

A front surface portion of the housing unit 38 is disposed with the speakers 30R and 30L, the receiver 32, the display screen 58 of the LCD 26 that is a first displaying unit, and an in-camera 60.

As depicted in FIG. 5, a back surface portion of the housing unit 38 is disposed with a display screen 64 of an LCD 62 that is a second displaying unit and a camera unit 66 of the camera device unit 18.

Figure 6:
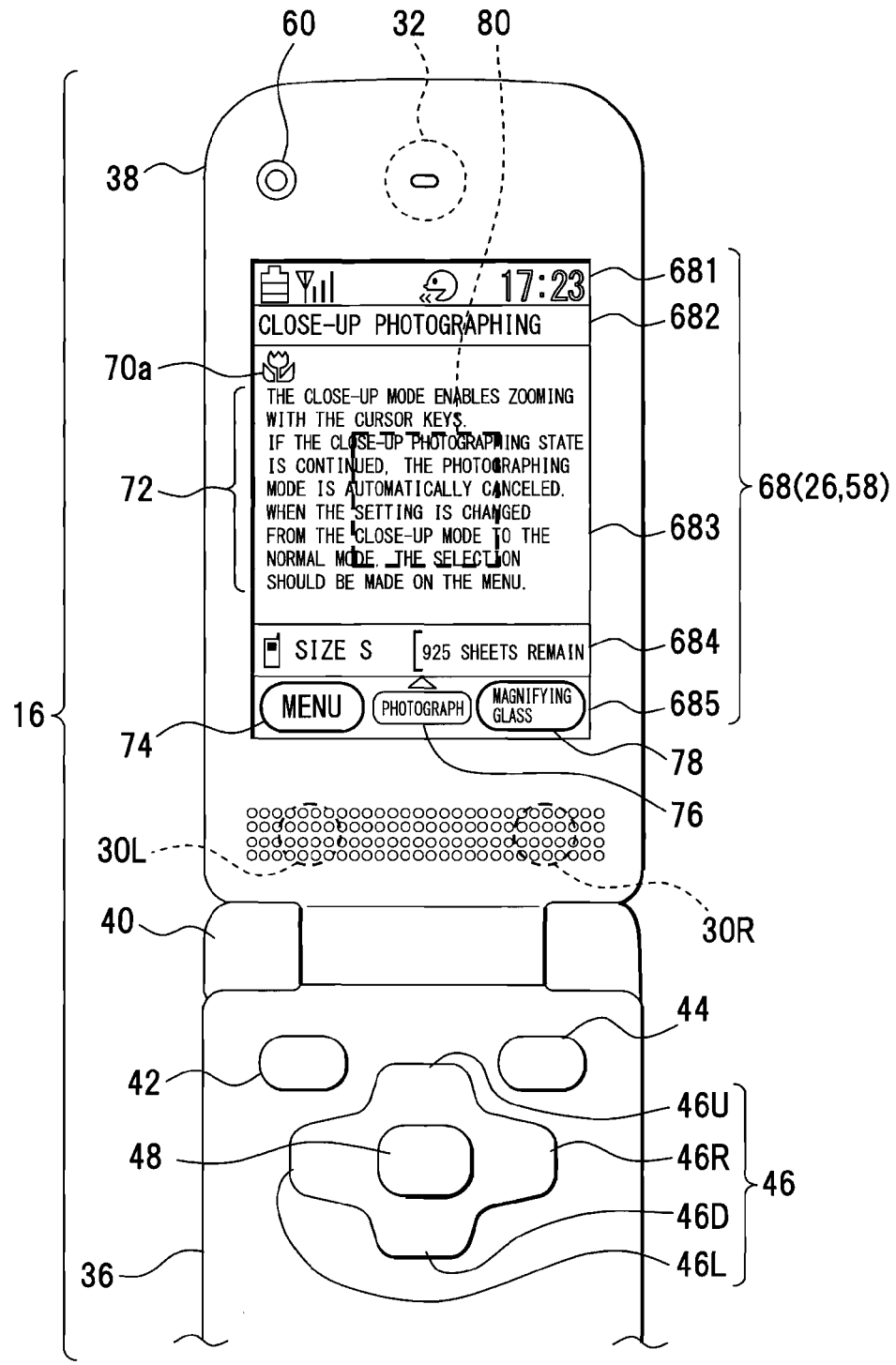
FIG. 6 is a diagram of an example of the portable telephone displaying a close-up photographing screen.
Figure 7:
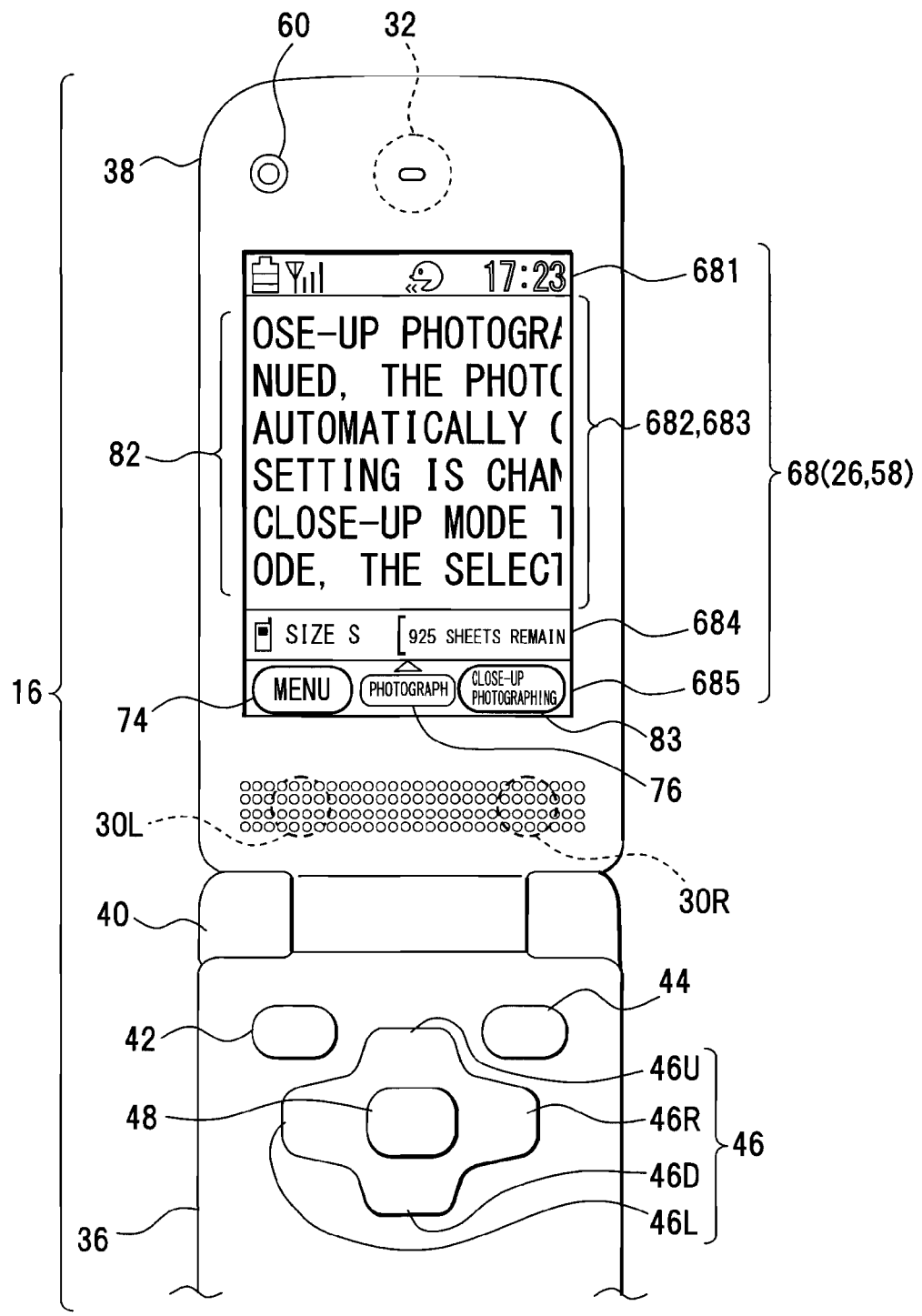
FIG. 7 is a diagram of an example of the portable telephone displaying an enlarged image.

The close-up photographing mode will be described with reference to FIGS. 6, 7 and 8. FIG. 6 depicts an example of a screen display of the close-up photographing mode, FIG. 7 depicts an example of enlarged image display and FIG. 8 is a diagram of an example of a captured image. The configurations depicted in FIGS. 6 to 8 are examples and the present invention is not limited to these configurations. In FIGS. 6 to 8, the portions same as FIG. 4 are denoted by the same reference numerals.

In the case of the close-up photographing mode, as depicted in FIG. 6, the display screen 58 of the LCD 26 displays a close-up photographing screen 68. First to five display areas 681, 682, 683, 684 and 685 are set on the close-up photographing screen 68. The display area 681 displays a telephone function, time, etc. The display area 682 displays a title indicative of a mode, etc., and displays "CLOSE-UP PHOTOGRAPHING" in this case to indicate that the currently operated function is the close-up photographing mode.

The display area 683 is a main display area, displays an image of a photographing frame, and displays a mark 70a representative of the close-up photographing mode and an image 72 photographed in close-up. The display area 684 displays the size information of the photographing size and the remaining amount information about the number of images corresponding to the photographing size.

The display area 685 is a software key display area and displays a menu key 74, a photographing key 76, and a magnifying glass key 78 as the software keys along with function information "MENU", "PHOTOGRAPH" and "MAGNIFYING GLASS". The operation of the menu key 74 is allocated to the menu key 42 that is the hardware key; the operation of the photographing key 76 is allocated to the decision key 48 that is the hardware key; and the operation of the magnifying glass key 78 is allocated to the phonebook key 44 that is the hardware key. Therefore, the magnifying glass key 78 may be displayed in a light-emitting manner and the phonebook key 44 may be displayed in a blinking manner to prompt the operation of a user.

In this display state, the pressing down of the phonebook key 44 assigned with the magnifying glass key 78 causes a shift to the magnifying glass function mode. In the magnifying glass function mode, the execution of the magnifying glass function is triggered by the pressing down of the phonebook key 44. In the magnifying glass function, an image in an enlarged area 80 set at the center of the image 72 of the photographing frame (a portion of the image 72) is extracted to generate an enlarged image 82 thereof (FIG. 7). As depicted in FIG. 7, the enlarged image 82 is displayed on the whole of the display areas 682 and 683. At that time, the display area 685 displays the menu key 74 and the photographing key 76 as the software keys and displays a close-up photographing key 83 instead of the above magnifying glass key 78. "MENU", "PHOTOGRAPH" and "CLOSE-UP PHOTOGRAPHING" are displayed as functional information representative of these software keys.

If the photographing key 76 is pressed down in the display state of the enlarged image 82, the display state returns to the image 72 of the close-up photographing mode (FIG. 6) and an image 84 depicted in FIG. 8 is captured in the image storage unit 224. The image 84 is the same as the image 72 before displaying the enlarged image 82.

Figure 9:
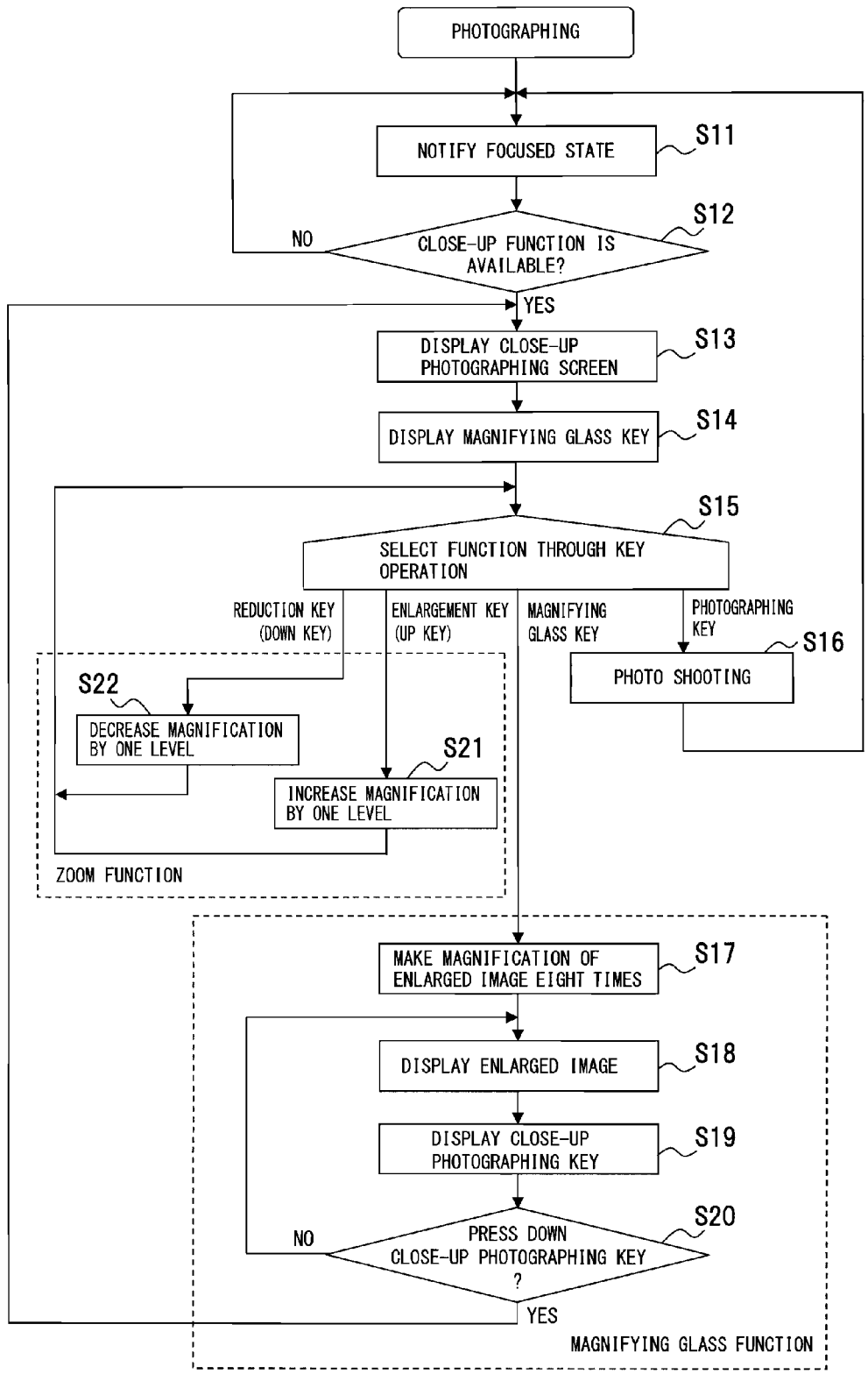
FIG. 9 is a flowchart of an example of a process procedure of a close-up photographing mode having a magnifying glass function.

The process procedure of photographing including the close-up photographing mode will be described with reference to FIG. 9. FIG. 9 is a flowchart of the process procedure of the close-up photographing mode having the magnifying glass function. The configuration depicted in FIG. 9 is an example and the present invention is not limited to this configuration.

This process procedure is an example of the photographing method or the photographing program. In the photographing, the camera function is activated from the menu screen of the portable telephone 16. In this photographing, the focused state is detected by the focused state notifying unit 6 from the image information acquired from the object. The focused state notifying unit 6 makes a focused state notification to notify the close-up photographing unit with a magnifying glass function 4 (step S11) and it is determined from the notification information whether the close-up function is available (step S12). This determination is determination of whether the close-up photographing is possible.

If the close-up function is available (YES at step S12), the shift to the close-up photographing mode is performed to display the close-up photographing screen 68 (FIG. 6) (step S13) and the above magnifying glass key 78 is displayed at this point (step S14).

The display state of the close-up photographing screen 68 enables selection from the functions, which are photo shooting, the magnifying glass function, and the zoom function, through key operation (step S15). Therefore, the pressing down of the photographing key 76 in this state causes a shift to the photo shooting (step S16) and the image 84 (FIG. 8) displayed on the current close-up photographing screen 68 is captured. This is independent of the image enlargement and reduction by zoom and the magnifying glass function.

If the magnifying glass key 78 is pressed down, the enlargement image 82 (FIG. 7) is generated from the image in the enlarged area 80 (FIG. 6) and the magnification of the enlarged image 82 is eight times, for example (step S17). The enlarged image 82 is displayed as a magnifying glass screen instead of the image 72 before the enlargement (step S18). The user is able to check details of the image 72 (FIG. 6) of the close-up photographing screen 68 from the enlarged image 82.

In the display state of the enlarged image 82, the above close-up photographing key 83 is displayed (step S19) and if the close-up photographing key 83 is operated by pressing down the phonebook key 44 corresponding to the close-up photographing key 83 (YES at step S20), the procedure goes back to step S13.

At step S15, the selection of the zoom function is performed by the up key 46U or the down key 46D, which is the hardware key. The up key 46U is set as an enlargement key for enlarging an image and the down key 46D is set as a reduction key for reducing an image. Therefore, the pressing down of the up key 46U or the pressing down of the down key 46D enables a process of increasing the magnification by one level (step S21) or a process of decreasing the magnification by one level (step S22) in a continuous manner. In this case, one level may be on the order of a magnification of two times, for example. The zoom function is different from the magnifying glass function in which an enlarged or reduced image is used as a captured image and if the photographing key 76 is pressed down in the state of image at an arbitrarily set magnification, the displayed image is captured into the image storage unit 224.

Although this embodiment uses the display of the software keys to enable guiding a user to the operations, if the software key for switch-over is displayed on the screen, the audio input/output unit 28 may be allowed to function as an audio generating unit to make a notification through guide sound to indicate that the function switch-over is available. Since a user receiving such a notification is prompted to perform the operation, a guide to the operation may be given by displaying the software keys and the hardware keys to enhance the convenience of the operation.

Features, advantages or modifications of the above described first embodiment will be listed as follows.

(1) The magnifying glass function is added to the photographing function as described above. In this embodiment, in response to the notification of the focused state from the focused state notifying unit 6, the availability of the close-up photographing function is determined from the focused state to display the close-up photographing screen 68. The close-up photographing screen 68 displays the magnifying glass key 78 and, for example, the eight-times enlarged image 82 of the image (standard image) is displayed by one-touch operation. The following operations may be performed by key operations on the close-up photographing screen 68.

The zoom function can be activated from the close-up photographing screen 68; if the enlargement key, for example, the up key 46U is continuously pressed, zoom-in can be performed on a level-by-level basis; and if the reduction key, for example, the down key 46D is continuously pressed, zoom-out can be performed on a level-by-level basis.

If the software key acting as the magnifying glass key 78 is pressed down, the magnifying glass function is activated and the center portion is zoomed in eight times larger to display the magnifying glass screen.

If the photographing key (e.g., the decision key or the execution key) is pressed down, a photograph can be taken. In this case, after the magnifying glass screen is displayed, the software key acting as the close-up photographing key is displayed on the screen. If the close-up photographing key is pressed down on the magnifying glass screen, the screen of the enlargement magnification before pressing down the magnifying glass key is displayed.

(2) Switch-over can appropriately and easily be performed to the close-up functions used in the close-up state, such as the magnifying glass, the barcode reader and handwritten memo.

(3) When the close-up photographing state is achieved, a user can automatically be guided to the switch-over to the available close-up function through the software key display, the blinking screen, and the blinking hardware key. The convenience of visually-impaired users can be expanded by the audio notification.

(4) The function after switch-over may automatically be determined from contents of the image being shot by a camera and if the function after switch-over is selected or activated in accordance with the automatic determination, functions can be switched without regard to a function desired to be used.

(5) When an aged person uses a portable telephone, texts are desired to be displayed with larger characters on a small display screen of the portable telephone. Although a character font is able to be enlarged for texts of e-mails, when small characters are tried to be photographed, characters displayed on a smaller screen are displayed in a smaller size in conventional close-up photographing. Thus, it is problematic that the user is unable to check whether a document desired to be captured is displayed on the screen.

Although a conventional close-up photographing function enables zooming in of characters by continuously pressing the cursor key for this problem, the zoomed screen may be returned to the original screen at the time of photographing and it is problematic that an extra time for the zoom operation is required before photographing and that the operability of the user is deteriorated.

On the other hand, when an attempt is made to photograph small characters in close-up, the portable terminal apparatus such as a portable telephone according to the first embodiment automatically displays the menu key that enables usage of the magnifying glass function and gives guidance by blinking, etc., of the display, and the pressing down of the key temporarily generates and displays an enlarged image (e.g., zoomed by eight times) of the center portion of the photographing screen. Since the enlarged image is generated and displayed, the portable terminal apparatus according to the embodiment can return to the close-up photographing after checking the position of the close-up portion and directly perform the photographing. This resolves the above problem.

(6) In the flowchart depicted in FIG. 9, the image before the enlargement (FIG. 8) may be captured into the image storage unit 224 by pressing down the close-up photographing key 83 at step S20.

Second Embodiment

A second embodiment has a configuration including a function of determining whether the close-up photographing function is available from a focal distance as information representative of the focused state.

Figure 10:
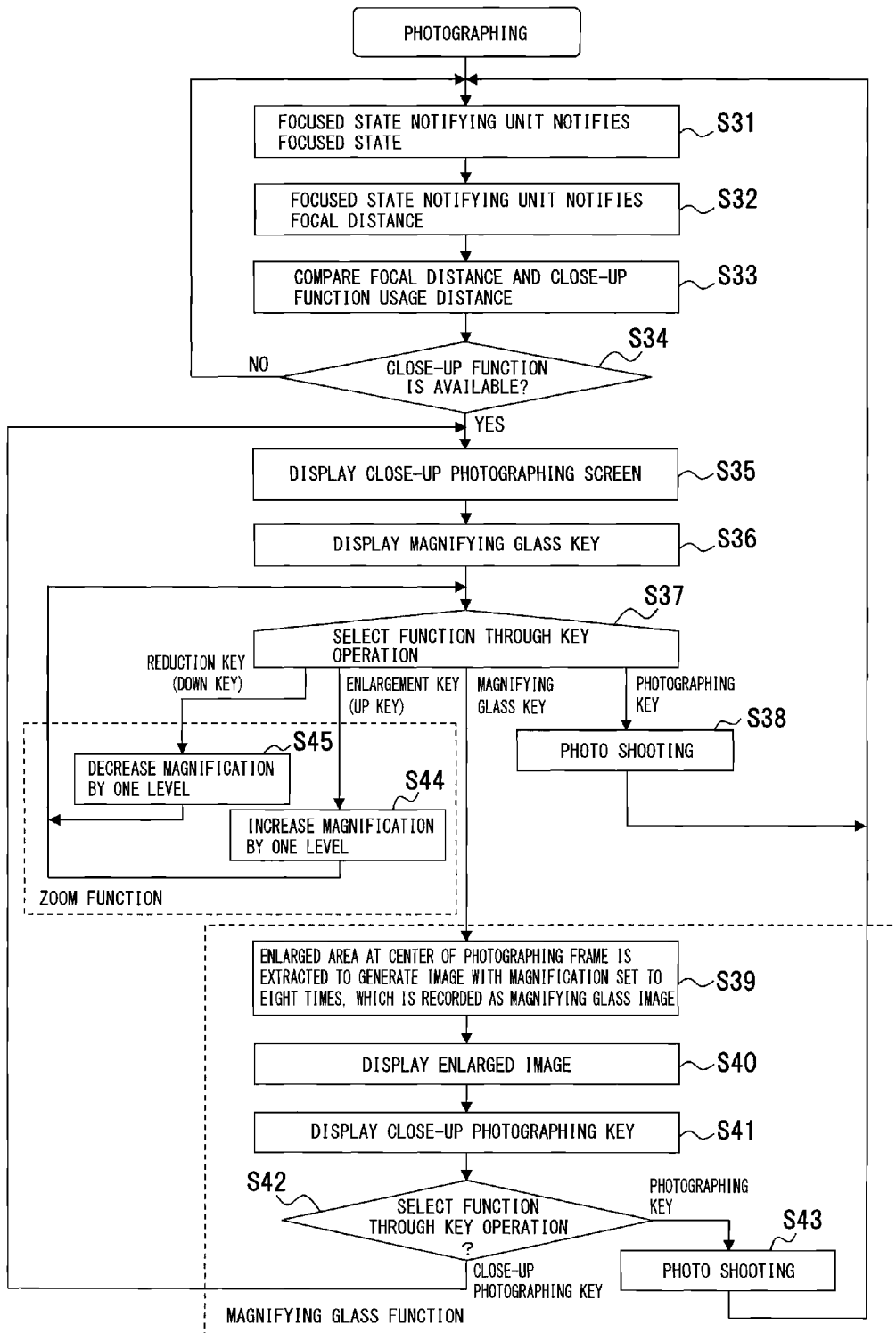
FIG. 10 is a flowchart of an example of a process procedure of a close-up photographing mode having a magnifying glass function according to a second embodiment.

The second embodiment will be described with reference to FIG. 10. FIG. 10 is a flowchart of an example of a process procedure of the close-up photographing mode having the magnifying glass function according to the second embodiment. The configuration depicted in FIG. 10 is an example and the present invention is not limited to this configuration.

The process procedure is an example of the photographing method or the photographing program. In the photographing, the camera function is activated from the menu screen of the portable telephone 16 as in the first embodiment. In this photographing, the focused state is detected by the focused state notifying unit 6 from the image information acquired from the object. The focused state notifying unit 6 notifies the close-up photographing unit with a magnifying glass function 4 of the focused state (step S31) to make a notification of a focal distance (step S32). The focal distance and the close-up function usage distance are compared (step S33) to determine whether the close-up function is available (step S34). This determination is determination of whether the close-up photographing is possible, as described above.

If the close-up function is available (YES at step S34), the shift to the close-up photographing mode is automatically performed as function selection to display the close-up photographing screen 68 (step S35) and the above magnifying glass key 78 is displayed at this point (step S36).

The display state of the close-up photographing screen 68 enables selection from the functions, which are photo shooting, the magnifying glass function, and the zoom function, through key operation (step S37). Therefore, the pressing down of the photographing key 76 in this state causes a shift to the photo shooting (step S38) and the image 84 (FIG. 8) displayed on the current close-up photographing screen 68 is captured. This is independent of the image enlargement and reduction by zoom and the magnifying glass function.

If the magnifying glass key 78 is pressed down, the enlarged area 80 at the center of the photographing frame is extracted to generate, for example, an image with the magnification set to eight times as the enlarged image 82 (FIG. 7), which is recorded as a magnifying glass image into the image storage unit 224 (step S39). The enlarged image 82 is displayed as a magnifying glass screen instead of the image 72 (step S40). The user is able to check details of the image (FIG. 6) of the close-up photographing screen 68 from the enlarged image 82.

In the display state of the enlarged image 82, the above close-up photographing key 83 is displayed (step S41). A function is selected in this display state to perform the photographing or to return to the close-up photographing screen 68 and the selected key operation is determined (step S42). If the photographing key 76 is operated, the shift to the photo shooting is performed as in the case of step S38 (step S43) and the image 84 (FIG. 8) displayed on the close-up photographing screen 68 is captured. Therefore, the image before the enlargement is captured.

If the close-up photographing key 83 is pressed down, the procedure goes back to step S35 and the display returns to the close-up photographing screen 68 before the enlarged image display.

At step S37, the selection of the zoom function is performed by the up key 46U or the down key 46D, which is the hardware key. The up key 46U is set as an enlargement key for enlarging an image and the down key 46D is set as a reduction key for reducing an image. Therefore, the pressing down of the up key 46U or the pressing down of the down key 46D enables a process of increasing the magnification by one level (step S44) or a process of decreasing the magnification by one level (step S45) in a continuous manner. In this case, one level may be on the order of a magnification of two times, for example. The zoom function is different from the magnifying glass function in which an enlarged or reduced image is used as a captured image and if the photographing key 76 is pressed down in the state of image at an arbitrarily set magnification, the displayed image is captured into the image storage unit 224.

This embodiment has the same effects and advantages as the first embodiment.

Third Embodiment

A third embodiment has a configuration having software-key blinking control added to the first embodiment to guide a user to the function switch-over, etc., through blinking display of a software key.

Figure 11:
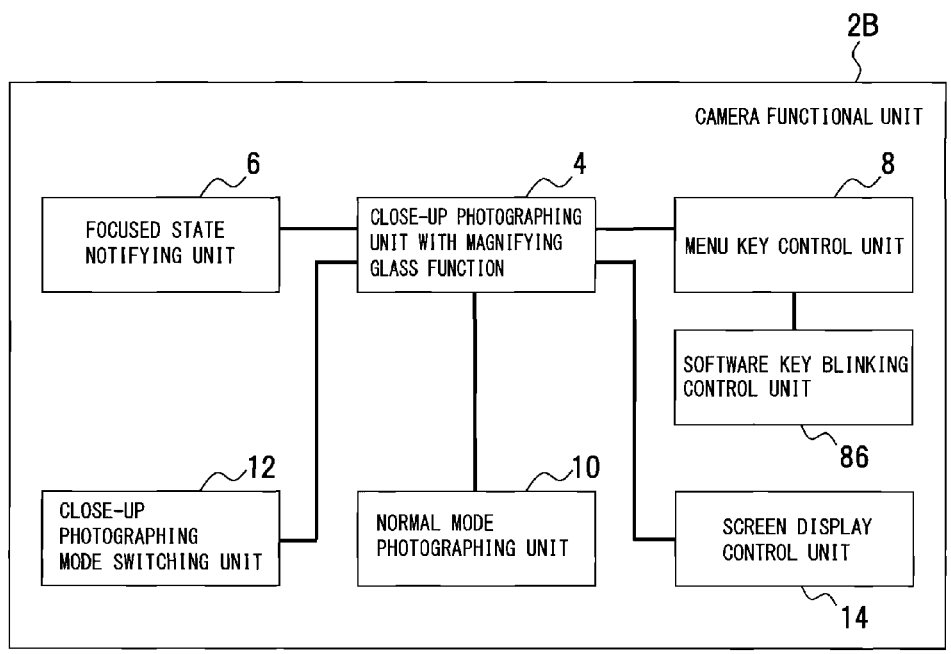
FIG. 11 is a diagram of an example of a camera functional unit according to a third embodiment.

The third embodiment will be described with reference to FIG. 11. FIG. 11 depicts an example of the camera functional unit according to the third embodiment. The configuration depicted in FIG. 11 is an example and the present invention is not limited to this configuration. In FIG. 11, the portions same as FIG. 1 are denoted by the same reference numerals.

A camera functional unit 2B includes the above menu key control unit 8 and a software key blinking control unit 86. The software key blinking control unit 86 drives the magnifying glass key 78 (FIG. 6) to blink when the magnifying glass key 78 is displayed in the close-up photographing mode to guide a user to the switch-over to the magnifying glass function.

When the enlarged image 82 (FIG. 7) is displayed and the close-up photographing key 83 is displayed, the close-up photographing key 83 is blinked correspondingly to the display to guide a user to the switching to the close-up photographing mode.

This configuration enables a software key for the switch-over and a position indicative of the software on the screen to blinking to facilitate distinguishing between the software key to be operated and other software and hardware keys, and precise and rapid operations can be performed by guiding a user to the function switch-over and the mode switch-over to enhance the convenience of the photographing function.

When small characters are photographed in close-up, the magnifying glass key enabling the magnifying glass function automatically starts blinking, and the central portion of the close-up photographing screen can temporarily be enlarged and displayed (e.g., zoomed by eight times) to return to the close-up photographing after checking the position of the close-up portion and directly perform the photographing by pressing down the key.

Other constituent elements are the same as the first embodiment and will not be described.

Fourth Embodiment

A fourth embodiment has a configuration having software-key blinking control added to the first embodiment to guide a user to the function switch-over, etc., through light-emitting display of a hardware key.

Figure 12:
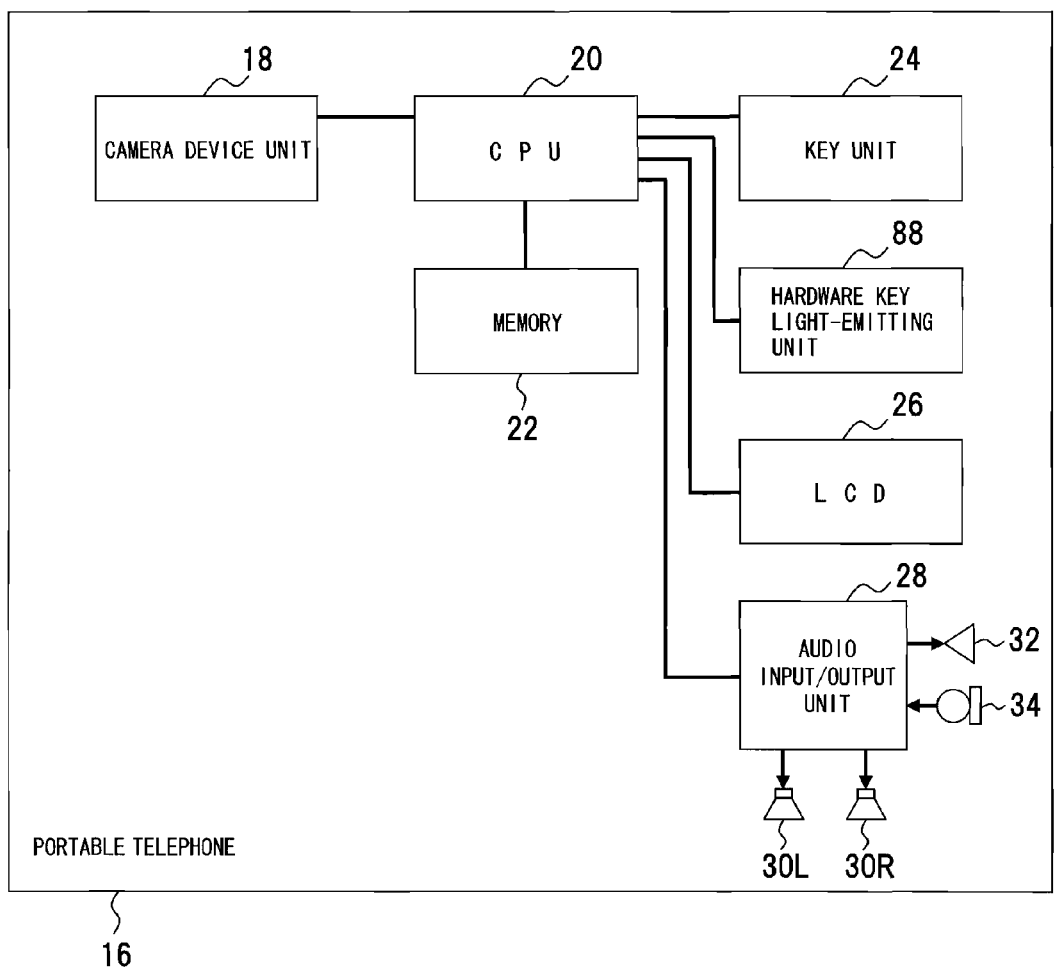
FIG. 12 is a diagram of an example of a portable telephone according to a fourth embodiment.

The fourth embodiment will be described with reference to FIG. 12. FIG. 12 depicts an example of a portable telephone according to the fourth embodiment. The configuration depicted in FIG. 12 is an example and the present invention is not limited to this configuration. In FIG. 12, the portions same as FIG. 2 are denoted by the same reference numerals.

This portable telephone 16 includes a hardware key light-emitting unit 88. The hardware key light-emitting unit 88 is an example of a light-emitting functional unit that prompts a user to select a hardware key and causes light emission of the hardware key assigned with a function for selecting or operating a function during a certain function operation to guide the operation of the user under the control of the CPU 20.

For example, when the magnifying glass key 78 (FIG. 6) is displayed in the close-up photographing mode, the hardware key light-emitting unit 88 drives the phonebook key 44, which is the hardware key corresponding to the magnifying glass key 78, to emit light and guides a user to the switching to the magnifying glass function through the light emission. For example, if a light-emitting element such as LED (light emitting diode) is disposed inside the phonebook key 44, the lighting thereof can drive the phonebook key 44 to emit light.

When the enlarged image 82 (FIG. 7) is displayed and the close-up photographing key 83 is displayed, the phonebook key 44 corresponding to the close-up photographing key 83 is driven to emit light as well correspondingly to the display to guide a user to the switching to the close-up photographing mode. A light-emitting element such as LED may be used for this light emission in the same way. Other constituent elements are the same as the first embodiment and will not be described.

This configuration enables a hardware key for the switch-over to emit light to distinguish between the hardware key to be operated and other software and hardware keys, and precise and rapid operations can be performed by guiding a user to the function switch-over and the mode switch-over to enhance the convenience of the photographing function.

Fifth Embodiment

In a fifth embodiment, the enlarged image is overlapped with the close-up photographing screen and displayed to enable visual recognition of the close-up photographing screen and the enlarged image together.

Figure 13:
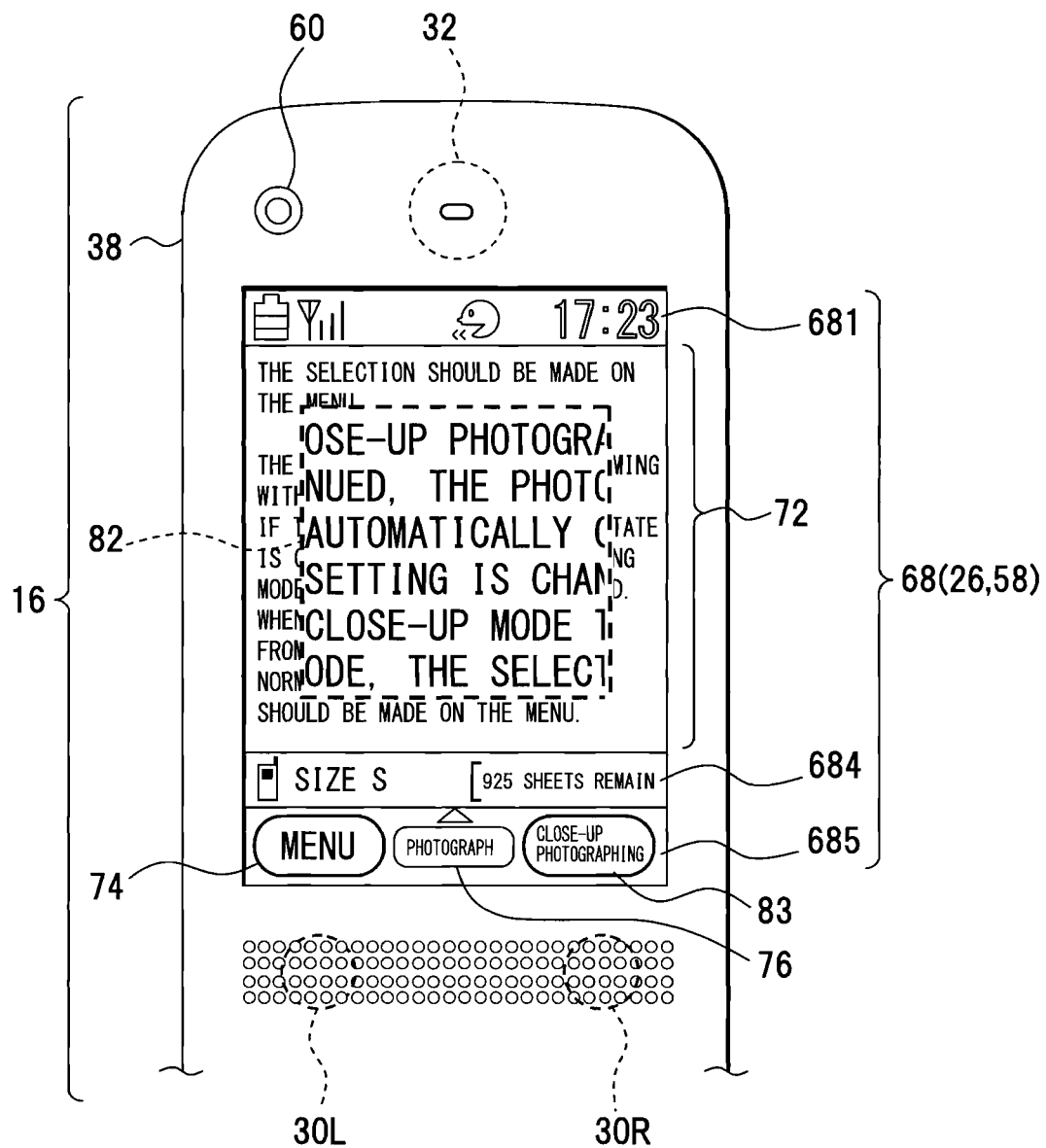
FIG. 13 is a diagram of an example of enlarged image display according to a fifth embodiment.

The fifth embodiment will be described with reference to FIG. 13. FIG. 13 depicts enlarged display according to the fifth embodiment. The configuration depicted in FIG. 13 is an example and the present invention is not limited to this configuration. In FIG. 13, the portions same as FIGS. 4, 6 and 7 are denoted by the same reference numerals.

Although the enlarged image 82 (FIG. 7) is displayed instead of the image 72 (FIG. 6) acquired from the object in the first to fourth embodiments, the image 72 before the enlargement and the enlarged image 82 may be displayed at the same time by overlapping the enlarged image 82 with the image 72 before the enlargement as depicted in FIG. 13. In this case, the magnification of the enlarged image 82 may be set smaller than the magnification of the first to fourth embodiments.

With this configuration, the image 72 before the enlargement and the enlarged image 82 can be checked at the same time. In other words, the image 84 (FIG. 8) to be captured and the enlarged image 82 can be checked at the same time.

Sixth Embodiment

A sixth embodiment has the enlarged glass function applied to the long-distance photographing mode used in such a case that an object at a long distance is photographed.

Figure 14:
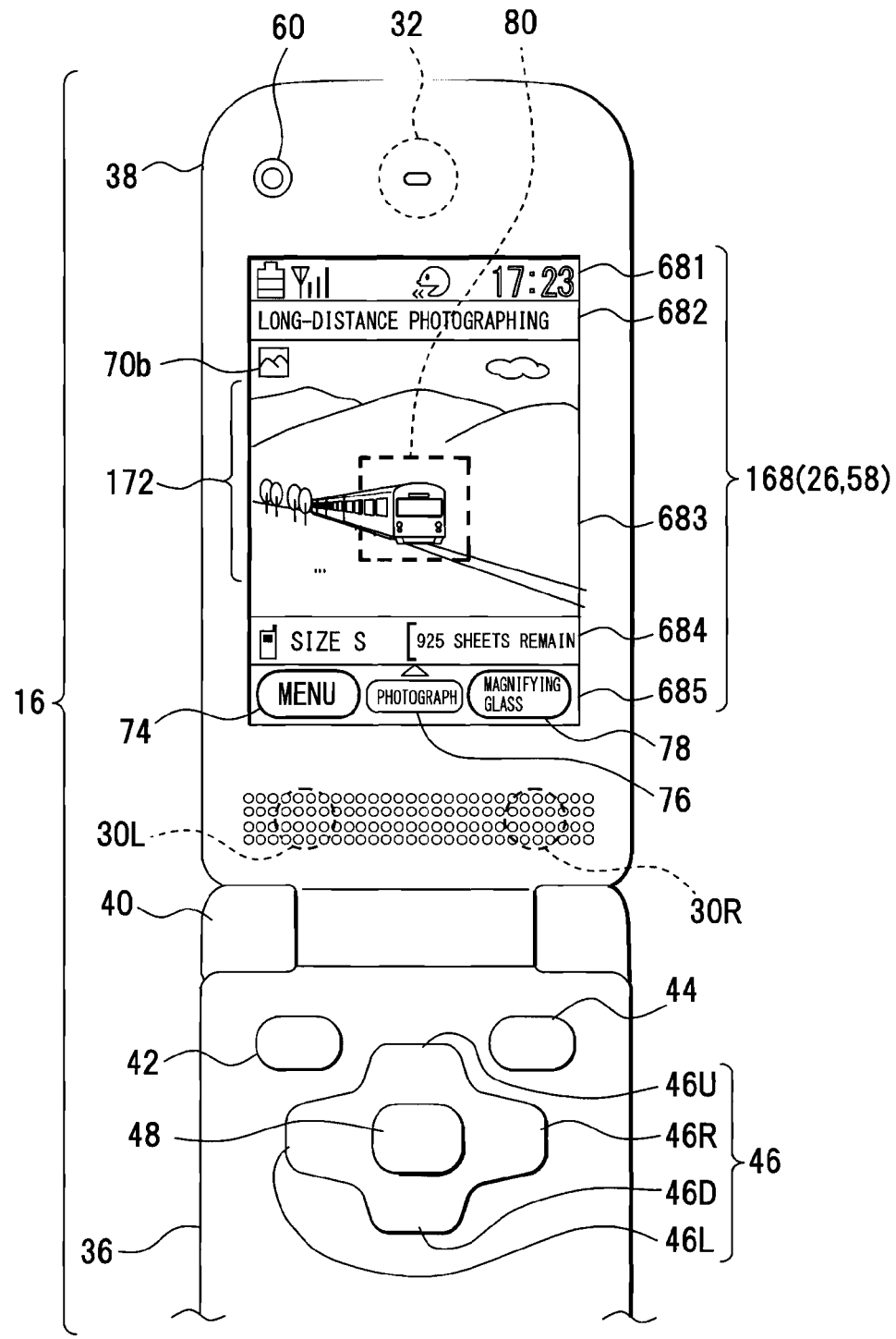
FIG. 14 is a diagram of an example of a portable telephone displaying a long-distance photographing screen according to a sixth embodiment.
Figure 15:
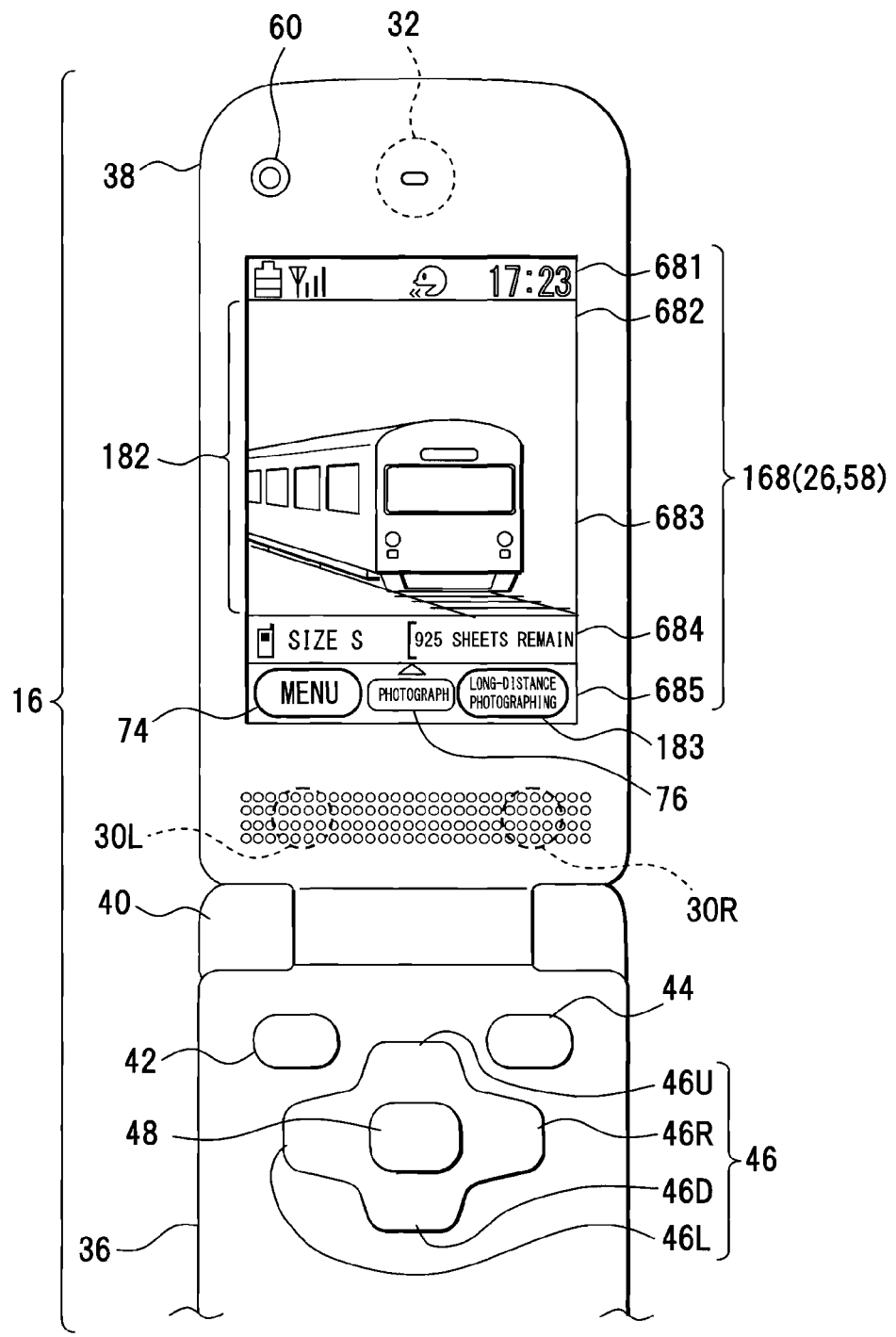
FIG. 15 is a diagram of an example of the portable telephone displaying an enlarged image according to the sixth embodiment.

The sixth embodiment will be described with reference to FIGS. 14 and 15. FIG. 14 depicts an example of screen display of a long-distance photographing mode according to the sixth embodiment and FIG. 15 depicts an example of the enlarged display screen. The configurations depicted in FIGS. 14 and 15 are examples and the present invention is not limited to these configurations. In FIGS. 14 and 15, the portions same as FIGS. 4, 6 and 7 are denoted by the same reference numerals.

In the case of the long-distance photographing mode, as depicted in FIG. 14, a long-distance photographing screen 168 is displayed on the display screen 58 of the LCD 26. The first to five display areas 681, 682, 683, 684 and 685 are set on the long-distance photographing screen 168 in the same way. The display area 681 displays a telephone function, time, etc., and the display area 682 displays a title indicative of a mode, etc., and displays "LONG-DISTANCE PHOTOGRAPHING" in this case to indicate that the currently operated function is the long-distance photographing mode.

The display are 683 is a main display area, displays an image of a photographing frame, and displays a mark 70b representative of the long-distance photographing mode and a long-distance image 172 photographed at a long distance. The display area 684 displays the size information of the photographing size and the remaining amount information about the number of images corresponding to the photographing size.

The display area 685 is a software key display area and displays the menu key 74, the photographing key 76, and the magnifying glass key 78 as the software keys along with function information "MENU", "PHOTOGRAPH" and "MAGNIFYING GLASS". The operation of the menu key 74 is allocated to the menu key 42 that is the hardware key; the operation of the photographing key 76 is allocated to the decision key 48 that is the hardware key; and the operation of the magnifying glass key 78 is allocated to the phonebook key 44 that is the hardware key. Therefore, the magnifying glass key 78 may be displayed in a light-emitting manner and the phonebook key 44 may be displayed in a blinking manner to prompt the operation of a user.

In this display state, the pressing down of the phonebook key 44 assigned with the magnifying glass key 78 causes a shift to the magnifying glass function mode. In the magnifying glass function mode, the execution of the magnifying glass function is triggered by the pressing down of the phonebook key 44. In the magnifying glass function, an image in the enlarged area 80 set at the center of the image 172 of the photographing frame (a portion of the image 172) is extracted to generate an enlarged image 182 thereof (FIG. 15). As depicted in FIG. 15, the enlarged image 182 is displayed on the whole of the display areas 682 and 683. The display area 685 displays the menu key 74 and the photographing key 76 as the software keys and displays a long-distance photographing key 183 instead of the above magnifying glass key 78. "MENU", "PHOTOGRAPH" and "LONG-DISTANCE PHOTOGRAPHING" are displayed as functional information representative of these software keys.

If the long-distance photographing key 183 is pressed down in the display state of the enlarged image 182, the display state returns to the image 172 of the long-distance photographing mode (FIG. 14). In this case, the image 172 before the enlargement is captured in the image storage unit 224. After the image 172 before the enlargement is displayed, the image capture may be performed by pressing down the photographing key 76 again.

Figure 16:
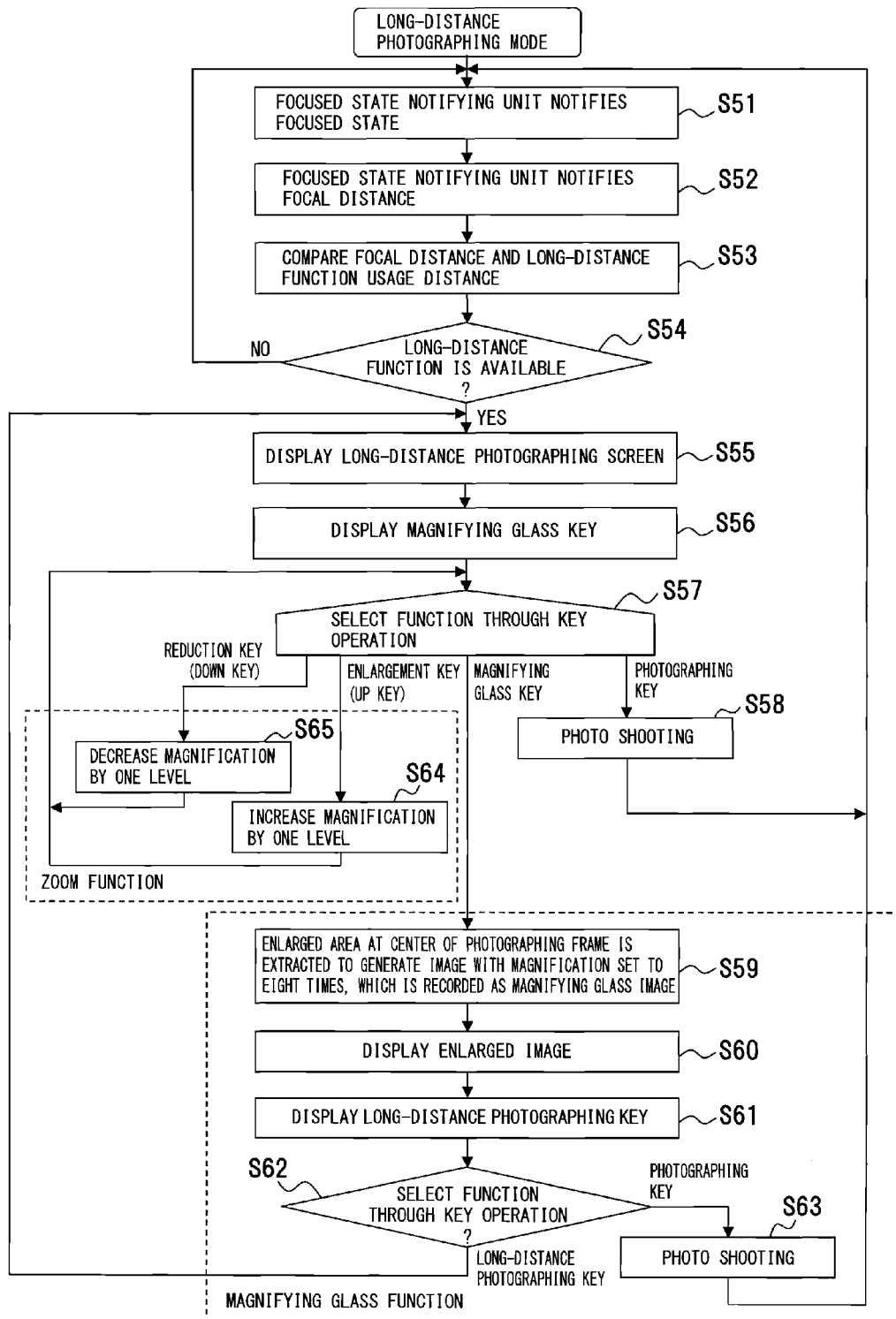
FIG. 16 is a flowchart of an example of a process procedure of a long-distance photographing mode having a magnifying glass function according to the sixth embodiment.

The process procedure of photographing including the long-distance photographing mode will be described with reference to FIG. 16. FIG. 16 is a flowchart of an example of the process procedure of the long-distance photographing mode having the magnifying glass function. The configuration depicted in FIG. 16 is an example and the present invention is not limited to this configuration.

This embodiment may have a configuration including a long-distance photographing unit with a magnifying glass function instead of the close-up photographing unit with a magnifying glass function 4 (FIG. 1) and a long-distance photographing mode switching unit instead of the close-up photographing mode switching unit 12 in the camera functional unit 2A. In this case, the long-distance photographing unit with a magnifying glass function is a functional unit that displays an enlarged image of a long-distance image by the magnifying glass function before capturing the long-distance image and the long-distance photographing mode switching unit is a functional unit that performs the switch-over to the long-distance photographing mode to execute the long-distance photographing mode.

The process procedure of the photographing including the long-distance photographing mode is an example of the photographing method or the photographing program. In this process procedure, the camera function is activated from the menu screen of the portable telephone 16 as in the first embodiment. In this photographing, the focused state is detected by the focused state notifying unit 6 from the image information acquired from the object. The focused state notifying unit 6 notifies the long-distance photographing unit with a magnifying glass function of the focused state (step S51) to make a notification of a focal distance (step S52). The focal distance and the long-distance function usage distance are compared (step S53) to determine whether the long-distance function is available (step S54). This determination is determination of whether the long-distance photographing is possible.

If the long-distance function is available (YES at step S54), the shift to the long-distance photographing mode is performed to display the long-distance photographing screen 168 (step S55) and the above magnifying glass key 78 is displayed at this point (step S56).

The display state of the long-distance photographing screen 168 enables selection from the functions, which are photo shooting, the magnifying glass function, and the zoom function, through key operation (step S57). Therefore, the pressing down of the photographing key 76 in this state causes a shift to the photo shooting (step S58) and the image 172 (FIG. 14) displayed on the current long-distance photographing screen 168 is captured. This is independent of the image enlargement and reduction by zoom and the magnifying glass function.

If the magnifying glass key 78 is pressed down, the enlarged area 80 at the center of the photographing frame is extracted to generate, for example, an image with the magnification set to eight times as the enlarged image 182 (FIG. 15), which is recorded as a magnifying glass image into the image storage unit 224 (step S59). The enlarged image 182 is displayed instead of the image 172 (step S60). The user is able to check details of the image 172 of the long-distance photographing screen 168 from the enlarged image 182.

In the display state of the enlarged image 182, the above long-distance photographing key 183 is displayed (step S61). A function is selected in this display state to perform the photographing or to return to the long-distance photographing screen 168 and the selected key operation is determined (step S62). If the photographing key 76 is operated, the shift to the photo shooting is performed as in the case of step S58 (step S63) and the long-distance image 172 (FIG. 14) is captured. Therefore, the image before the enlargement is captured.

If the long-distance photographing key 183 is pressed down, the procedure goes back to step S55 and the display returns to the long-distance photographing screen 168 before the enlarged image display.

At step S57, the selection of the zoom function is performed by the up key 46U or the down key 46D, which is the hardware key. The up key 46U is set as an enlargement key for enlarging an image and the down key 46D is set as a reduction key for reducing an image. Therefore, the pressing down of the up key 46U or the pressing down of the down key 46D enables a process of increasing the magnification by one level (step S64) or a process of decreasing the magnification by one level (step S65) in a continuous manner. In this case, one level may be on the order of a magnification of two times, for example. The zoom function is different from the magnifying glass function in which an enlarged or reduced image is used as a captured image and if the photographing key 76 is pressed down in the state of an image at an arbitrarily set magnification, the displayed image is captured into the image storage unit 224.

The enlarged image can be generated and displayed by the magnifying glass function to check details of the long-distance image before image capturing in the long-distance photographing as described above and the convenience of the photographing function can be enhanced.

Seventh Embodiment

A seventh embodiment has the enlarged glass function applied to the portrait photographing mode used in such a case that an object such as a person or an animal is photographed at a short distance.

Figure 17:
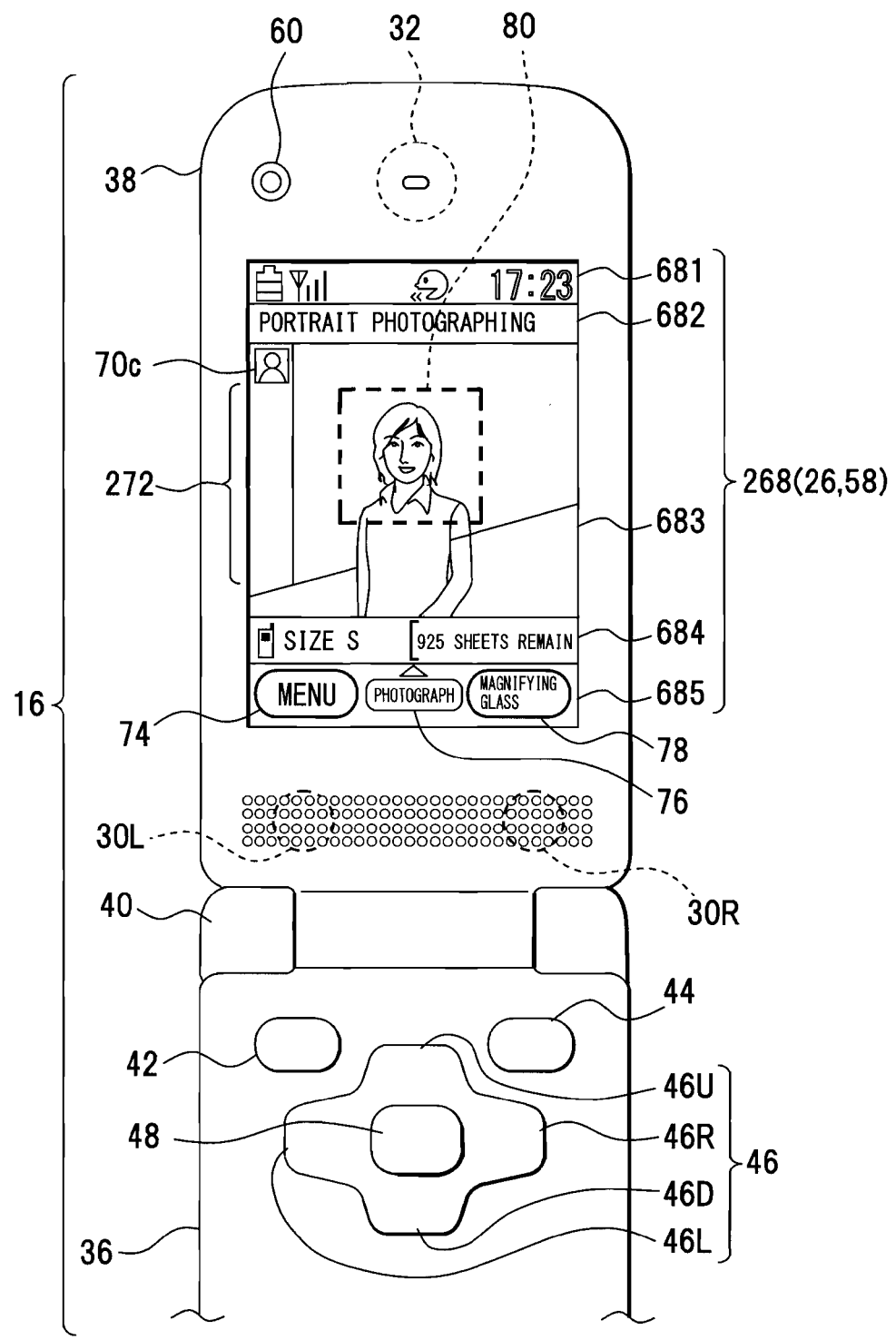
FIG. 17 is a diagram of an example of a portable telephone displaying a portrait photographing screen according to a seventh embodiment.
Figure 18:
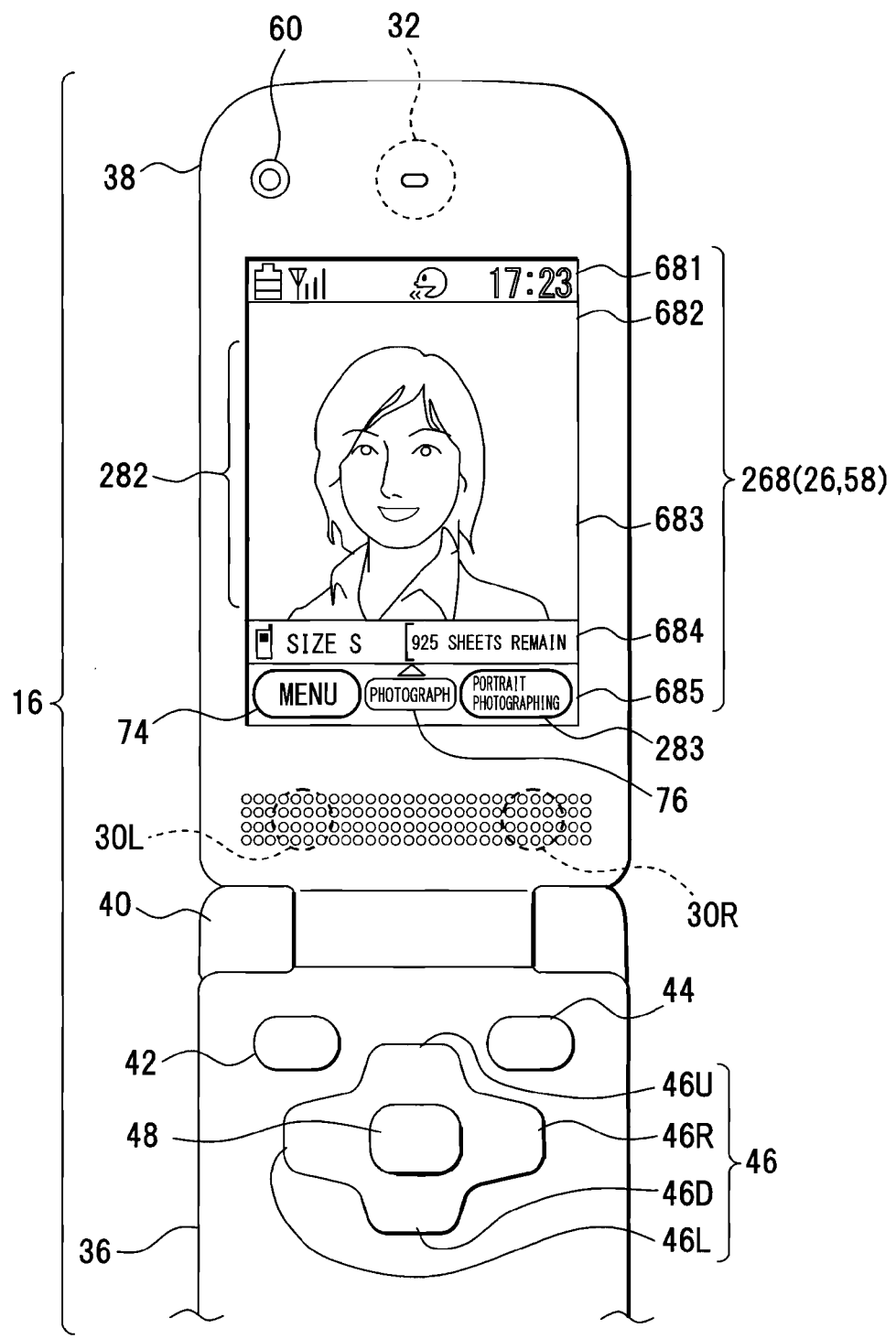
FIG. 18 is a diagram of an example of the portable telephone displaying an enlarged image according to the seventh embodiment.

The seventh embodiment will be described with reference to FIGS. 17 and 18. FIG. 17 depicts an example of screen display of a portrait photographing mode according to the seventh embodiment and FIG. 18 depicts an example of the enlarged display screen. The configurations depicted in FIGS. 17 and 18 are examples and the present invention is not limited to these configurations. In FIGS. 17 and 18, the portions same as FIGS. 4, 6 and 7 are denoted by the same reference numerals.

In the case of the portrait photographing mode, as depicted in FIG. 17, a portrait photographing screen 268 is displayed on the display screen 58 of the LCD 26. The first to fifth display areas 681, 682, 683, 684 and 685 are set on the portrait photographing screen 268 in the same way. The display area 681 displays a telephone function, time, etc., and the display area 682 displays a title indicative of a mode, etc., and displays "PORTRAIT PHOTOGRAPHING" in this case to indicate that the currently operated function is the portrait photographing mode.

The display are 683 is a main display area, displays an image of a photographing frame, and displays a mark 70c representative of the portrait photographing mode and a portrait image 272 photographed as a portrait. The display area 684 displays the size information of the photographing size and the remaining amount information about the number of images corresponding to the photographing size.

The display area 685 is a software key display area and displays the menu key 74, the photographing key 76, and the magnifying glass key 78 as the software keys along with function information "MENU", "PHOTOGRAPH" and "MAGNIFYING GLASS". The operation of the menu key 74 is allocated to the menu key 42 that is the hardware key; the operation of the photographing key 76 is allocated to the decision key 48 that is the hardware key; and the operation of the magnifying glass key 78 is allocated to the phonebook key 44 that is the hardware key. Therefore, the magnifying glass key 78 may be displayed in a light-emitting manner and the phonebook key 44 may be displayed in a blinking manner to prompt the operation of a user.

In this display state, the pressing down of the phonebook key 44 assigned with the magnifying glass key 78 causes a shift to the magnifying glass function mode. In the magnifying glass function mode, the execution of the magnifying glass function is triggered by the pressing down of the phonebook key 44. In the magnifying glass function, an image in the enlarged area 80 set at the center of the image 272 of the photographing frame (a portion of the image 272) is extracted to generate an enlarged image 282 thereof (FIG. 18). As depicted in FIG. 18, the enlarged image 282 is displayed on the whole of the display areas 682 and 683. The display area 685 displays the menu key 74 and the photographing key 76 as the software keys and displays a portrait photographing key 283 instead of the above magnifying glass key 78 at that time. "MENU", "PHOTOGRAPH" and "PORTRAIT PHOTOGRAPHING" are displayed as functional information representative of these software keys.

If the portrait photographing key 283 is pressed down in the display state of the enlarged image 282, the display state returns to the image 272 of the portrait photographing mode (FIG. 17). In this case, the image 272 before the enlargement is captured in the image storage unit 224. After the image 272 before the enlargement is displayed, the image capture may be performed by pressing down the photographing key 76 again.

Figure 19:
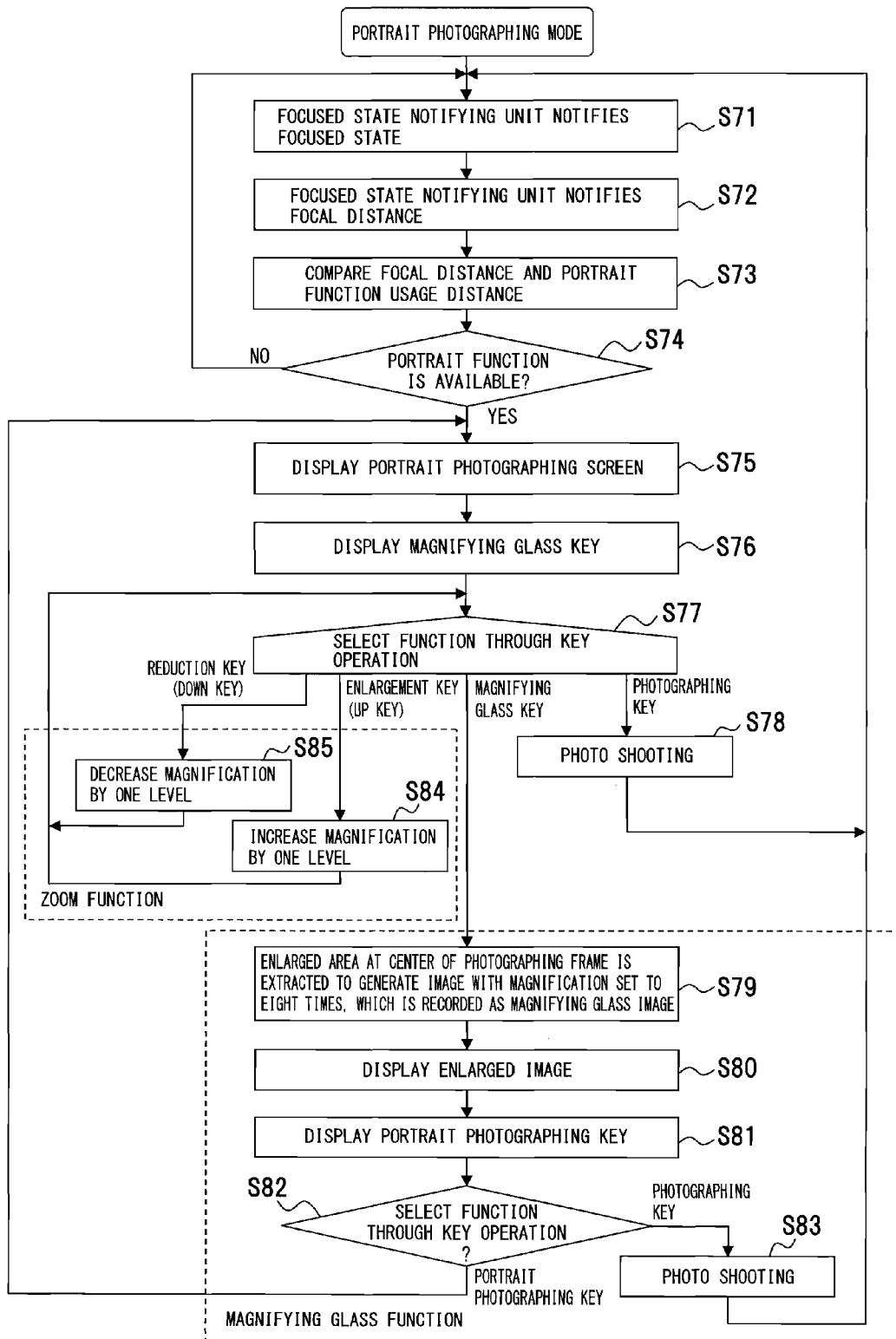
FIG. 19 is a flowchart of an example of a process procedure of a portrait photographing mode having a magnifying glass function according to the seventh embodiment.

The process procedure of photographing including the portrait photographing mode will be described with reference to FIG. 19. FIG. 19 is a flowchart of an example of the process procedure of the portrait photographing mode having the magnifying glass function. The configuration depicted in FIG. 19 is an example and the present invention is not limited to this configuration.

This embodiment may have a configuration including a portrait photographing unit with a magnifying glass function instead of the close-up photographing unit with a magnifying glass function 4 (FIG. 1) and a portrait photographing mode switching unit instead of the close-up photographing mode switching unit 12 in the camera functional unit 2A. In this case, the portrait photographing unit with a magnifying glass function is a functional unit that displays an enlarged image of a portrait image by the magnifying glass function before capturing the portrait image and the portrait photographing mode switching unit is a functional unit that performs the switch-over to the portrait photographing mode to execute the portrait photographing mode.

The process procedure of the photographing including the portrait photographing mode is an example of the photographing method or the photographing program. In this process procedure, the camera function is activated from the menu screen of the portable telephone 16 as in the first embodiment. In this photographing, the focused state is detected by the focused state notifying unit 6 from the image information acquired from the object. The focused state notifying unit 6 notifies the portrait photographing unit with a magnifying glass function of the focused state (step S71) to make a notification of a focal distance (step S72). The focal distance and the portrait function usage distance are compared (step S73) to determine whether the portrait function is available (step S74). This determination is determination of whether the portrait photographing is possible.

If the portrait function is available (YES at step S74), the shift to the portrait photographing mode is performed to display the portrait photographing screen 268 (step S75) and the above magnifying glass key 78 is displayed at this point (step S76).

The display state of the portrait photographing screen 268 enables selection from the functions, which are photo shooting, the magnifying glass function, and the zoom function, through key operation (step S77). Therefore, the pressing down of the photographing key 76 in this state causes a shift to the photo shooting (step S78) and the image 272 displayed on the current portrait photographing screen 268 is captured. This is independent of the image enlargement and reduction by zoom and the magnifying glass function.

If the magnifying glass key 78 is pressed down, the enlarged area 80 at the center of the photographing frame is extracted to generate, for example, an image with the magnification set to eight times as an enlarged image 282 (FIG. 18), which is recorded as a magnifying glass image into the image storage unit 224 (step S79). The enlarged image 282 is displayed instead of the image 272 (step S80). The user is able to check details of the image 272 of the portrait photographing screen 268 from the enlarged image 282.

In the display state of the enlarged image 282, the above portrait photographing key 283 is displayed (step S81). A function is selected in this display state to perform the photographing or to return to the portrait photographing screen 268 and the selected key operation is determined (step S82). If the photographing key 76 is operated, the shift to the photo shooting is performed as in the case of step S78 (step S83) and the portrait image 272 (FIG. 17) displayed on the portrait photographing screen 268 is captured. Therefore, the image before the enlargement is captured.

If the portrait photographing key 283 is pressed down, the procedure goes back to step S75 and the display returns to the portrait photographing screen 268 before the enlarged image display.

At step S77, the selection of the zoom function is performed by the up key 46U or the down key 46D, which is the hardware key. The up key 46U is set as an enlargement key for enlarging an image and the down key 46D is set as a reduction key for reducing an image. Therefore, the pressing down of the up key 46U or the pressing down of the down key 46D enables a process of increasing the magnification by one level (step S84) or a process of decreasing the magnification by one level (step S85) in a continuous manner. In this case, one level may be on the order of a magnification of two times, for example. The zoom function is different from the magnifying glass function in which an enlarged or reduced image is used as a captured image and if the photographing key 76 is pressed down in the state of an image at an arbitrarily set magnification, the displayed image is captured into the image storage unit 224.

The enlarged image can be generated and displayed by the magnifying glass function to check details of the portrait image, for example, an image of a face, etc., before image capturing in the portrait photographing as described above and the convenience of the photographing function can be enhanced.

Eighth Embodiment

An eighth embodiment is the case of configuring a menu display screen to which a shift is made from the display screens for switching the menu.

Figure 20:
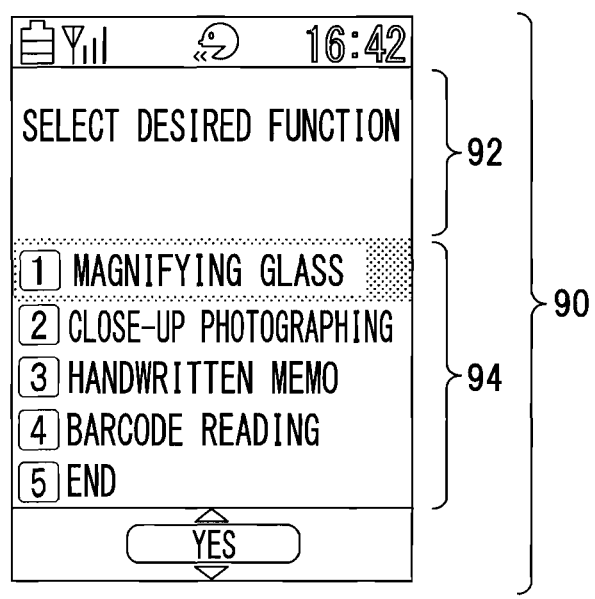
FIG. 20 is a diagram of a menu display screen according to an eighth embodiment.

The eighth embodiment will be described with reference to FIG. 20. FIG. 20 depicts display of a menu screen according to the eighth embodiment. The configuration depicted in FIG. 20 is an example and the present invention is not limited to this configuration.

In the above embodiments, the menu key 74 is displayed on the close-up photographing screen 68 (FIG. 6), the long-distance photographing screen 168 (FIG. 14), the portrait photographing screen 268 (FIG. 17) and the enlarged display screens thereof (FIGS. 7, 13, 15 and 18). When the menu key 74 is operated, the menu display screen is displayed.

As depicted in FIG. 20, a menu display screen 90 displays a guide display 92 for function switch-over and a switchable function display 94 including the options of a magnifying glass, close-up photographing, a handwritten memo, barcode reading, the end of the menu screen, etc. If a cursor is placed over any one of 1 MAGNIFYING GLASS, 2 CLOSE-UP PHOTOGRAPHING, 3 HANDWRITTEN MEMO, 4 BARCODE READING and 5 END and the decision key 48 (FIG. 4, etc.) is pressed down, the function selected by the cursor is executed.

In this case, a selection menu for other photographing modes such as the long-distance photographing and the portrait photographing may be displayed instead of the close-up photographing or in addition to the close-up photographing to enable selection from these modes.

Since this configuration includes an image switching function for making a selection from function list display to automatically perform the menu display of an optimum function and a function for overlapping and displaying the cursor on a preferentially executable menu, the convenience of the photographing function can be enhanced.

If the operation of focusing is automatically performed and the close-up photographing state is achieved in this embodiment, the blinking display of the close-up photographing menu may be stated to blink the phonebook key 44 that is a right software key (software key displayed on the right) with light and a notification may be made with sound at this timing to indicate that the key display is performed. In this case, if the close-up photographing state is not achieved, the close-up photographing menu may not be displayed. The menu displayed by pressing down the close-up photographing menu may be differentiated depending on a state of video shot by the camera.

When a determination is automatically made from the contents of the video (image) acquired from the object and, for example, if it is determined that a barcode is shot, a menu enabling preferential switch-over to the barcode reader may be displayed.

If the contents of video shot by the camera are those of a normal screen, a screen may be displayed that is equivalent to the close-up photographing menu displaying a conventional function list.

When such a variety of screen displays is achieved, the photographing function can be more expanded to enhance the convenience.

Ninth Embodiment

A ninth embodiment is configured by adding an enlarged-image magnification switching function to the magnifying glass function.

Figure 21:
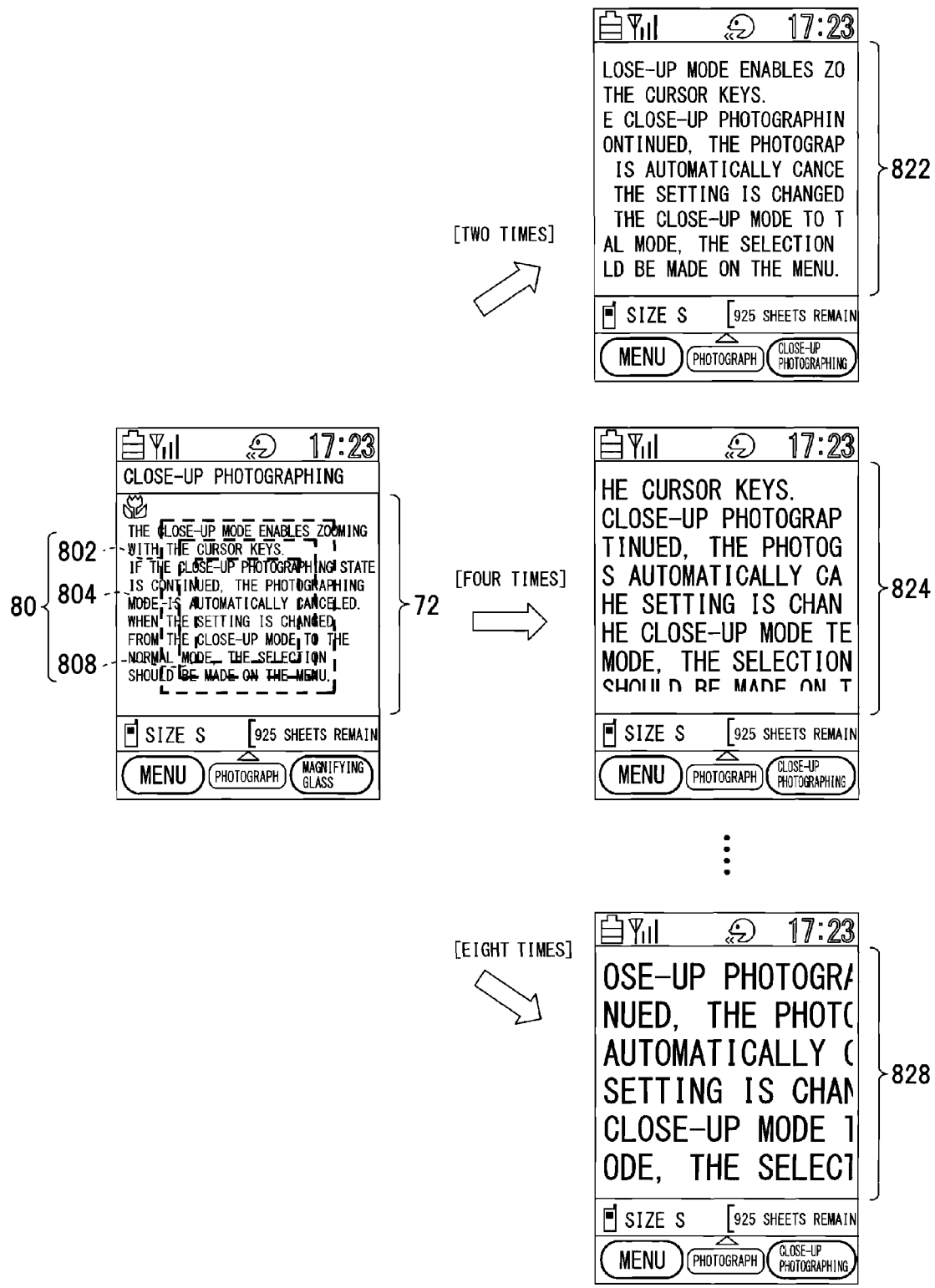
FIG. 21 is a diagram of a magnifying glass function having different enlargement magnifications according to a ninth embodiment.

The ninth embodiment will be described with reference to FIG. 21. FIG. 21 depicts the magnification switching according to the ninth embodiment. The configuration depicted in FIG. 21 is an example and the present invention is not limited to this configuration. In FIG. 21, the same portions as FIG. 6 are denoted by the same reference numerals.

Although the magnification of the enlarged image is fixed to eight times by way of example in the first to eighth embodiments, the magnification may be variable from two to eight times as depicted in FIG. 21 and the magnification may also be set greater than the eight times.

An image area of the enlarged object may be changed depending on, for example, the magnification of two to eight times set when the magnification is changed and, in this case, the enlarged area 80 may be set as an enlarged area 802 in the case of the enlargement magnification of two times, an enlarged area 804 in the case of the enlargement magnification of four times, and an enlarged area 808 in the case of the enlargement magnification of eight times. Enlarged images 822, 824 and 828 may be acquired correspondingly to the enlarged areas 802, 804 and 808.

Since this configuration enables the enlarged area 802, 804 or 808 to be selected depending on the magnification of the enlarged image, and the enlarged object, the screen may efficiently be displayed and the convenience of the photographing function may be enhanced in such a way that the image is more easily checked. In this case, the enlarged area 802, 804, or 808 may be selected correspondingly to the close-up photographing, the long-distance photographing and the portrait photographing, and the enlargement magnification of the enlarged image may be set in a variable manner.

Other Embodiments (1) Although the portable telephone 16 is exemplarily illustrated as an example of the photographing device, the photographing method, the photographing program and the portable terminal apparatus in the above embodiments, the photographing device, the photographing method, the photographing program and the portable terminal apparatus according to the present disclosure are applicable to, for example, a personal digital assistant (PDA) 96 (FIG. 22) having a camera function, a personal computer (PC) 98 (FIG. 23) having a camera function or any electronic devices equipped with a camera function, and is not limited to the portable telephone 16.

Figure 22:
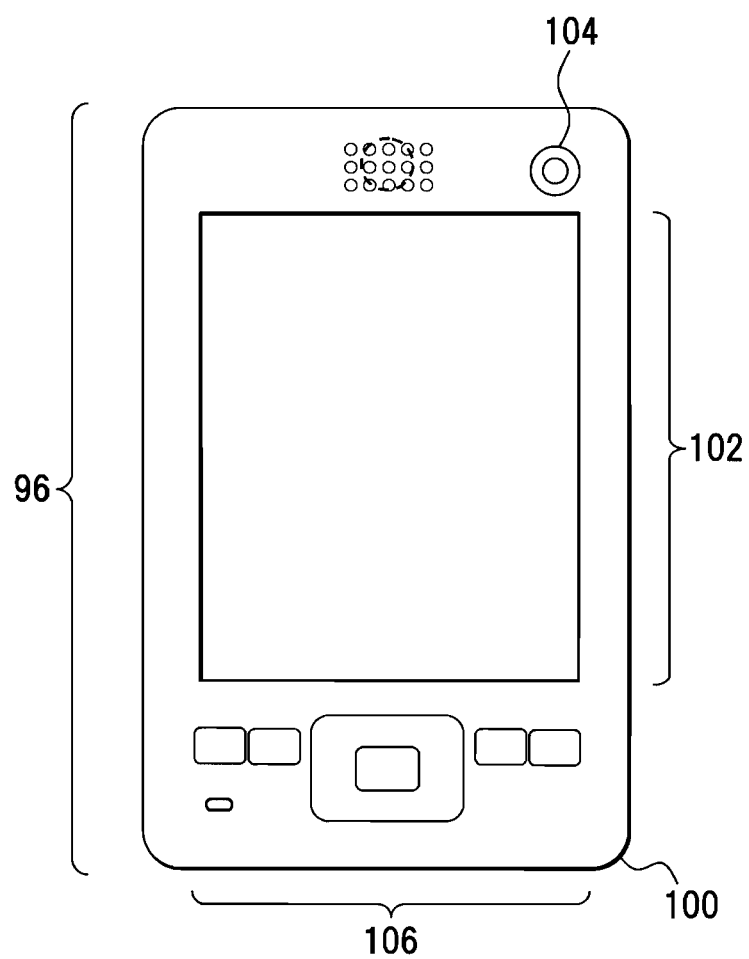
FIG. 22 is a diagram of a PDA according to other embodiments.

(2) As depicted in FIG. 22, the PDA 96 includes a displaying unit 102, a camera unit 104, a plurality of hardware keys 106, etc., on a housing 100 and displays the close-up photographing screen 68, etc., as in the case of the above portable telephone 16 and, since the magnifying glass function is provided, an enlarged image can be displayed on the screen of the displaying unit 102 before capturing the image acquired from the object to check the image and the convenience of the PDA 96 can be enhanced by expanding the photographing function. Since a user is guided to operations by the display of the above software keys, the blinking display thereof and the light-emission and blinking of the hardware keys, and is guided to operations by sound in some cases, the PDA can be provided as an easy-to-use photographing device along with the convenience of the photographing function.

Figure 23:
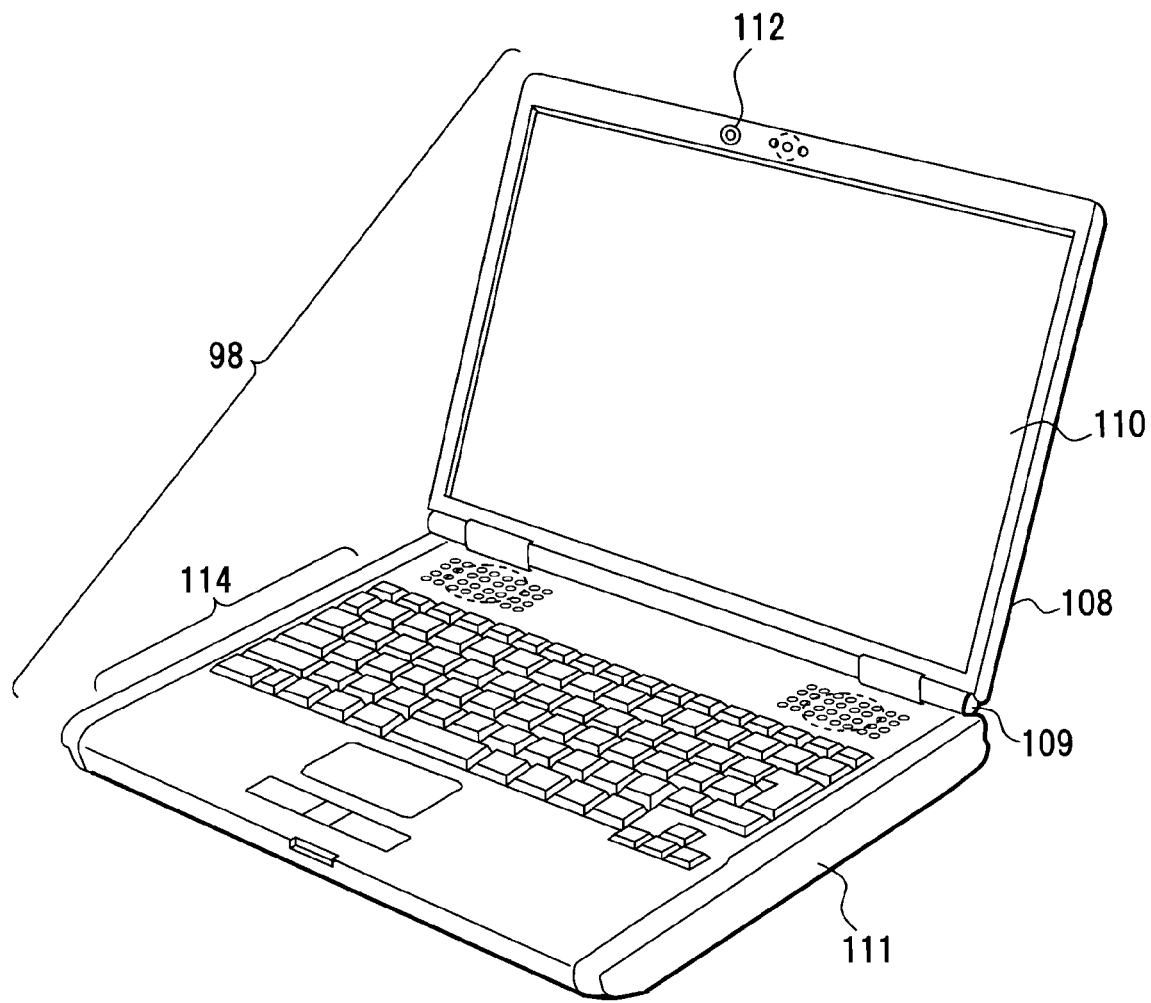
FIG. 23 is a diagram of a personal computer according to other embodiments.

(3) As depicted in FIG. 23, the PC 98 includes a displaying unit 110 and a camera unit 112 on a movable housing 108 and a plurality of hardware keys 114, etc., on a fixed housing 111 rotatably supporting the housing 108 with a hinge unit 109 and displays the close-up photographing screen 68, etc., as in the case of the above portable telephone 16 and, since the magnifying glass function is provided, an enlarged image can be displayed on the displaying unit 110 before capturing the image acquired from the object to check the image and the convenience of the PC 98 can be enhanced by expanding the photographing function. Since a user is guided to operations by the display of the above software keys, the blinking display thereof and the light emission and blinking of the hardware keys, and is guided to operations by sound in some cases, the PC can be provided as an easy-to-use photographing device along with the convenience of the photographing function.

(4) Although the above embodiments can give a guide with the screen PICT display, the LED light emission/blinking of the hardware keys, and voice or sound and performs the screen software key display, the blinking thereof (the software key displayed on the screen making a pair with the hardware key), the guidance by sound, and the blinking of the hardware key, the display for identifying the software key and the hardware key is not limited to the light emission, the blinking, or the sound.

(5) Although the enlarged image is generated by a digital process from a portion of the image acquired from the object in the above embodiments, the enlarged image may be generated from the entire portion of the image acquired from the object and displayed on the displaying unit, and the position of the enlarged area of extracting the image to be enlarged is not necessarily on the center of the image and may be the upper portion, the lower portion, or either the right or left portion, or the position may arbitrarily be changed. This configuration is able to further enhance the convenience and the degree of freedom of the photographing function.

(6) The cursor keys 46 may be allowed to function as the enlargement magnification specifying unit for the enlarged image, i.e., the up key 46U and the down key 46D of the cursor keys 46 may be assigned with the enlargement magnification specifying function in the above embodiments. In this case, the input operations of the up key 46U and the down key 46D of the cursor keys 46 are enabled when the enlargement image is displayed. Therefore, according to the specification of the enlargement magnification thereby, the close-up photographing unit with a magnifying glass function 4 acting as the enlarged image generating unit may be configured to enlarge or reduce an image based on the specified enlargement magnification.

(7) The cursor keys 46 may be allowed to function as the enlargement magnification specifying unit for the enlarged image and the enlargement magnification specifying unit, i.e., the up key 46U and the down key 46D of the cursor keys 46 may be configured to blink when the enlargement image is displayed in the above embodiments. Such blinking display can prompt a user to perform necessary operations.

The process described in the disclosed embodiments can be accomplished by a computer-executable program, and this program may be stored in a computer-readable memory device.

The recording medium includes a software package such as a CD-ROM storing a program and a memory device such as a memory inside and outside a computer.

In the embodiments, the memory device, such as a magnetic disk, a flexible disk, a hard disk, an optical disk (CD-ROM, CD-R, DVD, and so on), an optical magnetic disk (MD and so on) may be used to store instructions for causing a processor or a computer to perform the processes described above.

Furthermore, based on an indication of the program installed from the memory device to the computer, OS (operation system) operating on the computer, MW (middleware software), database management software or network, may execute one part of each processing to realize the embodiments.

Furthermore, the memory device includes a memory device in which a program is stored by downloading the program transmitted through a LAN or the Internet. Furthermore, the memory device is not limited to one. In the case that the processing of the embodiments is executed by a plurality of memory devices, a plurality of memory devices are included in the memory device. The component of the device is arbitrarily composed.

A computer can execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

The following effects can be acquired from the photographing device, the photographing method, the photographing program, and the portable terminal apparatus disclosed herein.

(1) Since the enlarged image is generated from the image acquired from the object and this enlarged image is displayed instead of the image before the image capturing or in an overlapped manner with the image, a state or details of the image to be captured can be checked with the enlarged image.

(2) The enlarged image of the image acquired from the object is generated from a portion or whole of the image before capturing and the image before enlargement can be captured after checking.

Technical ideas extracted from the embodiments of the present invention described above will then be listed. The technical ideas of the present invention may be comprehended at various levels and variations ranging from higher to lower conceptions and the present invention is not limited to the following description.

A photographing device to photograph an object includes a displaying unit to display an image acquired from the object, an image recording unit to record the image, an enlarged image generating unit to extract a portion or whole of the image displayed on the displaying unit to generate an enlarged image from the extracted image, and a display control unit to display the enlarged image instead of the image on the displaying unit or in an overlapped manner with the image, before capturing the image into the image recording unit.

Preferably, the photographing device may include an image recording control unit to record, in response to an image capturing instruction, the image before generating the enlarged image into the image recording unit.

Preferably, the photographing device may include a focus state notifying unit to notify the enlarged image generating unit of a focused state of the image, wherein the enlarged image generating unit extracts from the image an image for the enlarged image based on the focused state.

Preferably, the photographing device may include an enlargement instructing unit to represent an enlargement instruction of the image, wherein the enlargement instruction of the image causes the enlarged image generating unit to execute processing the image into the enlarged image and the display control unit to display the enlarged image generated by the enlarged image generating unit on the displaying unit.

In the photographing device, preferably, the enlargement instructing unit may be a key disposed on a device housing or a key displayed on the displaying unit or combination thereof.

In the photographing device, preferably, the image capturing instruction may be based on an operation of a key disposed on a device housing or a key displayed on the displaying unit or combination thereof.

Preferably, the photographing device may include an enlargement magnification specifying unit to specify an enlargement magnification for the enlarged image, wherein a specification of the enlargement magnification by the enlargement magnification specifying unit causes the enlarged image generating unit to change a size of the image based on the specified enlargement magnification.

In the photographing device, preferably, the enlargement magnification specifying unit may be enabled when the enlarged image is displayed and wherein the specification of an enlargement magnification thereof causes the enlarged image generating unit to change a size of the image based on the specified enlargement magnification.

In the photographing device, preferably, the enlargement magnification specifying unit may blink when the enlarged image is displayed.

In the photographing device, preferably, the enlargement magnification specifying unit may be a key disposed on a device housing or a key displayed on the displaying unit or combination thereof.

A photographing method to acquire an image from an object includes displaying the image acquired from the object, extracting a portion or whole of the displayed image to generate an enlarged image from the extracted image, and displaying the enlarged image instead of the image being displayed or in an overlapped manner with the image, before capturing the image into a recording unit.

A computer-readable recording medium to store a photographing program to be executed by a computer, the photographing program including displaying an image acquired from an object, extracting a portion or whole of the displayed image to generate an enlarged image from the extracted image, and displaying the enlarged image instead of the image being displayed or in an overlapped manner with the image, before capturing the image into a recording unit.

A portable terminal apparatus includes the photographing device.

Although the preferred embodiments of the photographing device, the photographing method, the photographing program, or the portable terminal apparatus have been described as above, the present invention is not limited to the above description and may variously be modified or altered by those skilled in the art based on the spirits of the present invention described in claims or disclosed in the embodiments for carrying out the invention of course and it is not needless to say that such modifications and alterations are included in the range of the present invention.

The photographing device, the photographing method, the photographing program, or the portable terminal apparatus disclosed herein are useful since the functions such as the close-up photographing mode are switched from the focused state of the image acquired from the object; the enlarged image is generated from a portion or whole of the image acquired from the object; the enlarged image can be displayed instead of or in an overlapped manner with the image acquired from the object to check details of the image such as the focused state of the image to be recorded; and the convenience of the portable terminal apparatus having the photographing function can be enhanced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A photographing device to photograph an object comprising:
    a displaying unit to display an image acquired from the object;
    an image recording unit to record the image acquired from the object;
    a focus state notifying unit to notify focal distance information that is representative of a focused state of the image acquired from the object;
    an enlargement instructing unit to give an enlargement instruction on the image acquired from the object in response to a user selection of an input key that is displayed in response to a shift to one photographing mode of a close-up photographing mode, a long-distance photographing mode and a portrait photographing mode;
    an enlarged image generating unit to compare the focal distance information notified by the focus state notifying unit with usage distance of the one photographing mode, to determine whether the one photographing mode is available based on a result of comparison of the focal distance information with the usage distance, to shift to the one photographing mode and enable the enlargement instructing unit when the one photographing mode is available, and by the enlargement instruction of the enlargement instructing unit, to extract a portion or whole of the image acquired from the object, which is displayed on the displaying unit, to generate an enlarged image from the portion or whole; and
    a display control unit to display the enlarged image within the image acquired from the object in an overlapped manner with the image acquired from the object, before capturing the image acquired from the object into the image recording unit.

2. The photographing device of claim 1, comprising an image recording control unit to record, in response to an image capturing instruction, the image acquired from the object into the image recording unit.

3. The photographing device of claim 1, wherein the enlargement instructing unit is a key disposed on a device housing or a key displayed on the displaying unit or combination thereof.

4. The photographing device of claim 2, wherein the image capturing instruction is based on an operation of a key disposed on a device housing or a key displayed on the displaying unit or combination thereof.

5. The photographing device of claim 1, comprising an enlargement magnification specifying unit to specify an enlargement magnification for the image acquired from the object, wherein a specification of the enlargement magnification by the enlargement magnification specifying unit causes the enlarged image generating unit to change the enlarged image based on the specified enlargement magnification.

6. A photographing device to photograph an object comprising:
    a displaying unit to display an image acquired from the object;
    an image recording unit to record the image acquired from the object;
    a focus state notifying unit to notify focal distance information that is representative of a focused state of the image acquired from the object;
    an enlargement instructing unit to give an enlargement instruction on the image acquired from the object in response to a user selection of an input key that is displayed in response to a shift to one photographing mode of a close-up photographing mode, a long-distance photographing mode and a portrait photographing mode;
    an enlarged image generating unit to compare the focal distance information notified by the focus state notifying unit with usage distance of the one photographing mode, to determine whether of the one photographing mode is available based on a result of comparison of the focal distance information with the usage distance, to shift to the one photographing mode and enable the enlargement instructing unit when the one photographing mode is available, and by the enlargement instruction of the enlargement instructing unit, to extract a portion or whole of the image acquired from the object, which is displayed on the displaying unit, to generate an enlarged image from the portion or whole;
    a display control unit to display the enlarged image on the displaying unit instead of the image acquired from the object or in an overlapped manner with the image acquired from the object, before capturing the image acquired from the object into the image recording unit; and
    an enlargement magnification specifying unit to specify an enlargement magnification for the image acquired from the object,
    wherein the enlargement magnification specifying unit is enabled when the enlarged image is displayed and wherein the specification of an enlargement magnification thereof causes the enlarged image generating unit to change the enlarged image based on the specified enlargement magnification.

7. The photographing device of claim 5, wherein the enlargement magnification specifying unit blinks when the enlarged image is displayed.

8. The photographing device of claim 5, wherein the enlargement magnification specifying unit is a key disposed on a device housing or a key displayed on the displaying unit or combination thereof.

9. A photographing method to acquire an image from an object comprising:
- displaying the image acquired from the object;
- comparing focal distance information, which is notified and is representative of a focused state, with usage distance of one photographing mode of a close-up photographing mode, a long-distance photographing mode and a portrait photographing mode, determining whether the one photographing mode is available based on a result of said comparing, shifting to the one photographing mode and enabling an enlargement instruction on the image acquired from the object when the one photographing mode is available;
- by the enlargement instruction on the image acquired from the object in response to a user selection of an input key that is displayed in response to a shift to the one photographing mode, extracting a portion or whole of the displayed image acquired from the object to generate an enlarged image from the portion or whole; and
- displaying the enlarged image within the image acquired from the object in an overlapped manner with the image acquired from the object, before capturing the image acquired from the object into a recording unit.

10. A non-transitory computer-readable recording medium to store a photographing program to be executed by a computer, the photographing program causes the computer to perform a process comprising:
- displaying an image acquired from an object;
- comparing focal distance information, which is notified and is representative of a focused state, with usage distance of one photographing mode of a close-up photographing mode, a long-distance photographing mode and a portrait photographing mode, determining whether the one photographing mode is available based on a result of said comparing, shifting to the one photographing mode and enabling an enlargement instruction on the image acquired from the object when the one photographing mode is available;
- by the enlargement instruction on the image acquired from the object in response to a user selection of an input key that is displayed in response to a shift to the one photographing mode, extracting a portion or whole of the displayed image acquired from the object to generate an enlarged image from the portion or whole; and
- displaying the enlarged image within the image acquired from the object in an overlapped manner with the image acquired from the object, before capturing the image acquired from the object into a recording unit.

11. A portable terminal apparatus comprising the photographing device of claim 1.

12. A photographing method to acquire an image from an object comprising:
- displaying the image acquired from the object;
- comparing focal distance information, which is notified and is representative of a focused state, with usage distance of one photographing mode of a close-up photographing mode, a long-distance photographing mode and a portrait photographing mode, determining whether the one photographing mode is available based on a result of said comparing, shifting to the one photographing mode and enabling an enlargement instruction on the image acquired from the object when the one photographing mode is available;
- by the enlargement instruction on the image acquired from the object in response to a user selection of an input key that is displayed in response to a shift to the one photographing mode, extracting a portion or whole of the displayed image acquired from the object to generate an enlarged image from the portion or whole;
- displaying the enlarged image instead of the image acquired from the object or in an overlapped manner with the image acquired from the object, before capturing the image acquired from the object into a recording unit; and
- specifying an enlargement magnification for the image acquired from the object,
- wherein said specifying an enlargement magnification is enabled when the enlarged image is displayed and wherein the enlarged image is changed based on the specified enlargement magnification.

13. A non-transitory computer-readable recording medium to store a photographing program to be executed by a computer, the photographing program causes the computer to perform a process comprising:
- displaying an image acquired from an object;
- comparing focal distance information, which is notified and is representative of a focused state, with usage distance of one photographing mode of a close-up photographing mode, a long-distance photographing mode and a portrait photographing mode, determining whether the one photographing mode is available based on a result of said comparing, shifting to the one photographing mode and enabling an enlargement instruction on the image acquired from the object when the one photographing mode is available;
- by the enlargement instruction on the image acquired from the object in response to a user selection of an input key that is displayed in response to a shift to the one photographing mode, extracting a portion or whole of the displayed image acquired from the object to generate an enlarged image from the portion or whole;
- displaying the enlarged image instead of the image acquired from the object or in an overlapped manner with the image acquired from the object, before capturing the image acquired from the object into a recording unit; and
- specifying an enlargement magnification for the image acquired from the object,
- wherein said specifying an enlargement magnification is enabled when the enlarged image is displayed and wherein the enlarged image is changed based on the specified enlargement magnification.

14. A photographing device to photograph an object comprising:
- a displaying unit to display an image acquired from the object;
- an image recording unit to record the image acquired from the object;
- a focus state notifying unit to notify focal distance information that is representative of a focused state of the image acquired from the object;
- an enlargement instructing unit to give an enlargement instruction on the image acquired from the object in response to a user selection of an input key that is displayed in response to a shift to one photographing mode of a close-up photographing mode, a long-distance photographing mode and a portrait photographing mode;
- an enlarged image generating unit to compare the focal distance information notified by the focus state notifying unit with usage distance of the one photographing mode, to determine whether the one photographing mode is available based on a result of comparison of the focal distance information with the usage distance, to shift to the one photographing mode and enable the enlargement instructing unit when the one photographing mode is available, and by the enlargement instruction of the enlargement instructing unit, to extract a portion or whole of the image acquired from the object, which is displayed on the displaying unit, to generate an enlarged image from the portion or whole; and a display control unit to display the enlarged image on the displaying unit instead of the image acquired from the object, before capturing the image acquired from the object into the image recording unit.

15. A photographing method to acquire an image from an object comprising:

displaying the image acquired from the object;

comparing focal distance information, which is notified and is representative of a focused state, with usage distance of one photographing mode of a close-up photographing mode, a long-distance photographing mode and a portrait photographing mode, determining whether the one photographing mode is available based on a result of said comparing, shifting to the one photographing mode and enabling an enlargement instruction on the image acquired from the object when the one photographing mode is available;

by the enlargement instruction on the image acquired from the object in response to a user selection of an input key that is displayed in response to a shift to the one photographing mode, extracting a portion or whole of the displayed image acquired from the object to generate an enlarged image from the portion or whole; and displaying the enlarged image instead of the image acquired from the object, before capturing the image acquired from the object into a recording unit.

16. A non-transitory computer-readable recording medium to store a photographing program to be executed by a computer, the photographing program causes the computer to perform a process comprising:

displaying an image acquired from an object;

comparing focal distance information, which is notified and is representative of a focused state, with usage distance of one photographing mode of a close-up photographing mode, a long-distance photographing mode and a portrait photographing mode, determining whether the one photographing mode is available based on a result of said comparing, shifting to the one photographing mode and enabling an enlargement instruction on the image acquired from the object when said at least the one photographing mode is available;

by the enlargement instruction on the image acquired from the object in response to a user selection of an input key that is displayed in response to a shift to the one photographing mode, extracting a portion or whole of the displayed image acquired from the object to generate an enlarged image from the portion or whole; and displaying the enlarged image instead of the image acquired from the object, before capturing the image acquired from the object into a recording unit.

* * * * *